US011040418B2

(12) United States Patent
Vanier

(10) Patent No.: US 11,040,418 B2
(45) Date of Patent: Jun. 22, 2021

(54) WELDING ACCESSORY APPARATUS

(71) Applicant: RSV Welder Repair, Inc., Nunica, MI (US)

(72) Inventor: Raymond Vanier, Coopersville, MI (US)

(*) Notice: Subject to any disclaimer, the term of this patent is extended or adjusted under 35 U.S.C. 154(b) by 400 days.

(21) Appl. No.: 16/210,715

(22) Filed: Dec. 5, 2018

(65) Prior Publication Data
US 2019/0105740 A1 Apr. 11, 2019

Related U.S. Application Data

(63) Continuation-in-part of application No. 15/962,730, filed on Apr. 25, 2018, now Pat. No. 10,766,104, which is a continuation of application No. 14/589,051, filed on Jan. 5, 2015, now Pat. No. 9,981,351.

(60) Provisional application No. 62/076,516, filed on Nov. 7, 2014, provisional application No. 62/727,993, filed on Sep. 6, 2018.

(51) Int. Cl.
| B23K 37/00 | (2006.01) |
| G02B 5/20 | (2006.01) |
| B23K 26/142 | (2014.01) |
| B23K 26/16 | (2006.01) |
| B23K 9/32 | (2006.01) |
| B08B 15/04 | (2006.01) |
| B08B 15/00 | (2006.01) |

(52) U.S. Cl.
CPC .......... B23K 37/006 (2013.01); B08B 15/007 (2013.01); B08B 15/04 (2013.01); B23K 9/32 (2013.01); B23K 9/321 (2013.01); B23K 26/142 (2015.10); B23K 26/16 (2013.01); G02B 5/208 (2013.01)

(58) Field of Classification Search
CPC .... B23K 15/06; B23K 20/14; B23K 26/1224; B23K 26/142; B23K 9/321; B23K 26/16; B23K 37/006; B08B 15/007; B08B 15/04
See application file for complete search history.

(56) References Cited

U.S. PATENT DOCUMENTS

| 4,890,335 | A | * | 1/1990 | Crowson | ................. | A61F 9/068 |
| | | | | | | 2/171.3 |
| 5,036,754 | A | * | 8/1991 | Simms | .................... | B08B 15/00 |
| | | | | | | 454/65 |

(Continued)

Primary Examiner — Brian W Jennison
(74) Attorney, Agent, or Firm — Black, McCuskey, Souers & Arbaugh LPA

(57) ABSTRACT

A welding accessory apparatus can include a welding lens, a manifold, an articulated arm assembly, and a tube. The welding lens can be mounted to the manifold. The manifold can have an intake aperture, an outlet aperture, and an internal cavity. The articulated arm assembly can be interconnected with the manifold and be adjustable whereby a user can position the manifold and the welding lens among different positions and orientations in three dimensions and then retain the manifold and the welding lens in the selected position and orientation. The tube can be interconnected with the manifold and can communicate with the intake aperture and the internal cavity by way of the outlet aperture. At least part of the tube can be moved and held in place with the manifold and the welding lens by the articulated arm assembly.

20 Claims, 20 Drawing Sheets

(56) References Cited

U.S. PATENT DOCUMENTS

| | | | | |
|---|---|---|---|---|
| 5,241,154 A * | 8/1993 | Estrate | ................... | B23K 9/32 |
| | | | | 219/136 |
| 5,613,771 A * | 3/1997 | Siverling | ................ | F21V 21/20 |
| | | | | 362/275 |
| 6,332,837 B1 * | 12/2001 | Wilk | ....................... | B08B 15/04 |
| | | | | 454/63 |
| 7,126,085 B1 * | 10/2006 | Boehme | .................. | B23K 9/32 |
| | | | | 219/147 |
| 7,901,164 B2 * | 3/2011 | Skradski | ............ | B23Q 11/0046 |
| | | | | 408/67 |
| 8,362,395 B1 * | 1/2013 | Cummings | ............ | B23K 9/321 |
| | | | | 219/136 |
| 9,216,475 B2 * | 12/2015 | Straw | .................... | B23K 26/364 |
| 2008/0203679 A1 * | 8/2008 | Hermoso | ........... | B23Q 11/0046 |
| | | | | 279/3 |
| 2014/0213164 A1 * | 7/2014 | Leisner | ................... | B23K 9/32 |
| | | | | 454/65 |
| 2015/0000232 A1 * | 1/2015 | Hammers | .............. | B01D 49/00 |
| | | | | 55/385.1 |
| 2017/0136588 A1 * | 5/2017 | Power | .................... | B23K 9/321 |

* cited by examiner

WELDING ACCESSORY APPARATUS

CROSS-REFERENCE TO RELATED APPLICATIONS

This application claims the benefit of U.S. Provisional Patent Application Ser. No. 62/727,993 for a WELDING ACCESSORY APPARATUS, filed on 6 Sep. 2018, which is hereby incorporated by reference in its entirety. In addition, this application is a continuation-in-part of application Ser. No. 15/962,730 for a WELDING ACCESSORY APPARATUS, filed on 25 Apr. 2018, which is hereby incorporated by reference in its entirety, which itself is a continuation of application Ser. No. 14/589,051 for a WELDING ACCESSORY APPARATUS, filed on 5 Jan. 2015, which claimed priority to U.S. Provisional Patent Application Ser. No. 62/076,516 for a WELDING ACCESSORY APPARATUS, filed on 7 Nov. 2014. All of these priority applications are hereby incorporated in their entireties.

BACKGROUND

1. Field

The present disclosure relates to accessories for welding and welding stations.

2. Description of Related Prior Art

Welding is a fabrication technique that joins materials, usually metals or thermoplastics, by causing melting of the work-pieces and adding a filler material to form a pool of molten material (the weld pool) that cools to become a joint. Sometimes pressure is applied in conjunction with heat to produce the weld. Welding can be dangerous and unhealthy. The risk of burns is significant. To prevent injury, welders wear personal protective equipment in the form of heavy leather gloves and protective long sleeve jackets to avoid exposure to extreme heat and flames. Additionally, the brightness of the weld area leads to a condition called arc eye or flash burns in which ultraviolet light causes inflammation of the cornea and can burn the retinas of the eyes. Goggles and welding helmets with dark UV-filtering face plates are worn to prevent this exposure. Since the 2000s, some helmets have included a face plate which instantly darkens upon exposure to the intense UV light. To protect bystanders, the welding area is often surrounded with translucent welding curtains. These curtains, made of a polyvinyl chloride plastic film, shield people outside the welding area from the UV light of the electric arc. Welders are also exposed to dangerous gases and particulate matter. Processes like flux-cored arc welding and shielded metal arc welding produce smoke containing particles of various types of oxides. The size of the particles in question tends to influence the toxicity of the fumes, with smaller particles presenting a greater danger. This is because smaller particles have the ability to cross the blood brain barrier. Fumes and gases, such as carbon dioxide, ozone, and fumes containing heavy metals, can be dangerous to welders lacking proper ventilation and training. Exposure to manganese welding fumes, for example, even at low levels (less than 0.2 mg/m3), may lead to neurological problems or to damage to the lungs, liver, kidneys, or central nervous system. Nanoparticles can become trapped in the alveolar macrophages of the lungs and induce pulmonary fibrosis.

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A welding accessory apparatus can include a welding lens, a manifold, an articulated arm assembly, and a tube. The welding lens can be mounted to the manifold. The manifold can have at least one intake aperture spaced from the welding lens. The manifold can also have at least one outlet aperture can be spaced from the at least one intake aperture and the welding lens. The manifold can also have at least one internal cavity that can communicate with both of the at least one intake aperture and the at least one outlet aperture. The articulated arm assembly can be interconnected with the manifold and can be configured to be adjustable by hand whereby a user can position the manifold and the welding lens among a plurality of different positions and orientations in three dimensions and the articulated arm assembly retains the manifold and the welding lens in the position and orientation selected by the user. The tube can be interconnected with the manifold and can communicate with the at least one intake aperture and the internal cavity by way of the at least one outlet aperture. At least part of the tube can be moved and held in place with the manifold and the welding lens by the articulated arm assembly.

BRIEF DESCRIPTION OF THE DRAWINGS

The detailed description set forth below references the following drawings.

DETAILED DESCRIPTION

Figure 1:
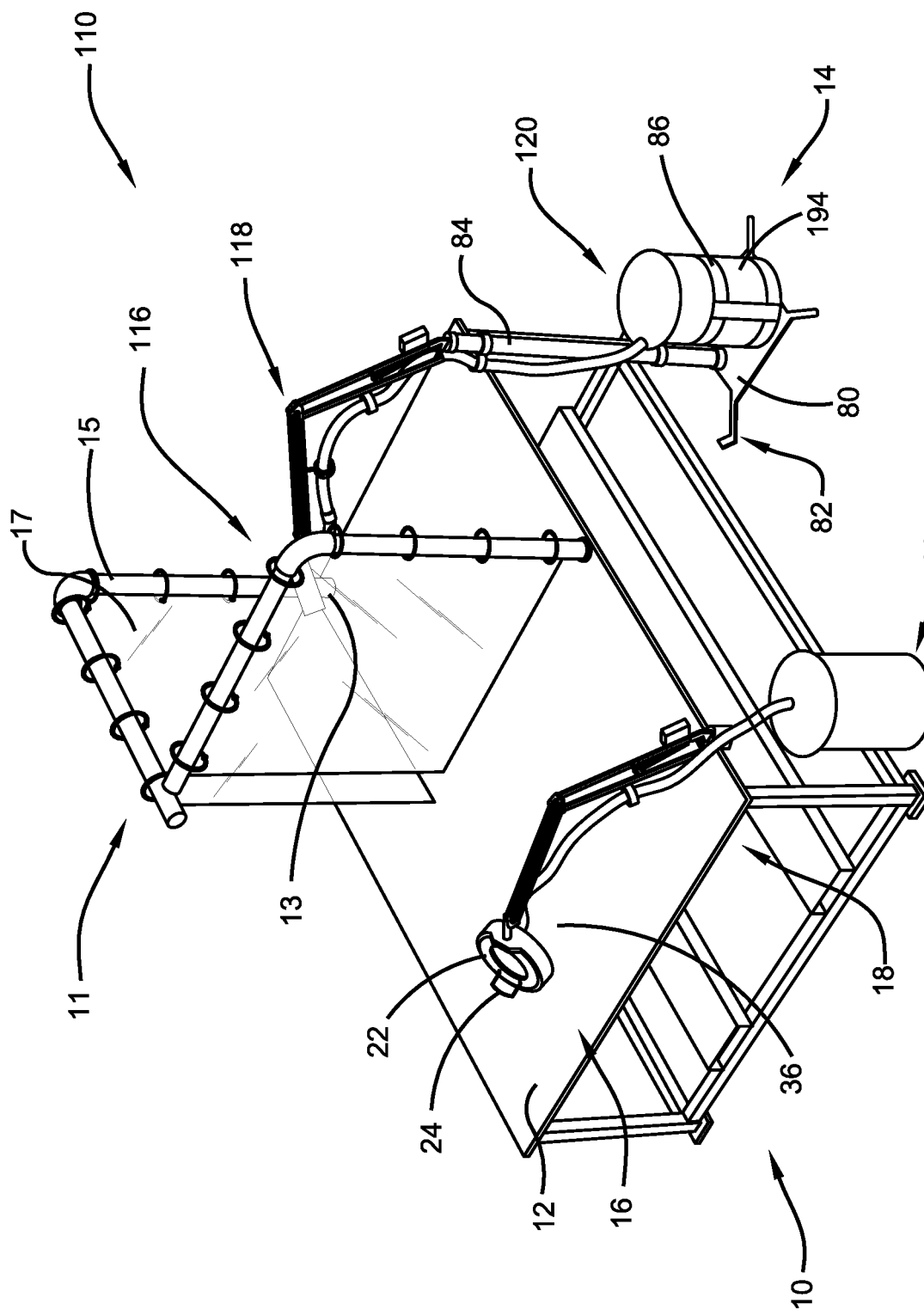
FIG. 1 is a first perspective view of first and second embodiments of the present disclosure.

A plurality of different embodiments of the present disclosure is shown in the Figures of the application. Similar features are shown in the various embodiments of the present disclosure. Similar features in different Figures have been numbered with a common reference numeral and have been differentiated by an alphabetic suffix. Similar features in a particular Figure have been numbered with a common two-digit, base reference numeral and have been differentiated by a different leading numeral. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide numerous improvements for the health and safety of a human welder. During experimental testing, it has been found that at least one embodiment of the present disclosure substantially removes odors, fumes, gases and particulates from the environment. Odor was not detectable by the human tester; thus the human tester was not intaking the fumes. The removal of fumes and gases also inhibits the accumulation of soot and debris on the welding lens.

Another advantage found in at least one embodiment of the present disclosure is enhanced vision and reduced eye strain. In at least one embodiment, an innermost lens of a welding accessory apparatus accumulates vision-retarding particulate matter at a significantly reduced rate. Thus, the welder is thus not prompted to move closer to the work-pieces to see the welding process or squint to see.

At least one embodiment includes a circular lens assembly including a magnifying lens. The circular lens provides a more natural field of view. The magnification assists in vision, however the lens assembly has yielded unexpected improvements beyond magnification. Generally, conditions are utterly dark for a human welder wearing a welding helmet before welding begins. When the welding torch is engaged, the interior of the helmet is instantaneously filled with bright light. This can cause the welder to reflexively move and/or shock the retina, resulting in eye strain. In the present disclosure, the welder does not need a helmet, so peripheral light can be continuously perceived and the start of welding does not define as abrupt a change of visual conditions. The peripheral vision that is permitted by at least one embodiment of the invention also enhances safety by allowing the welder to more easily sense objects and individuals moving proximate to the welding station.

It has also been found that the lens arrangement of at least one embodiment of the present disclosure allows the welder to see the quality of the weld bead behind the current point of welding. Any overlaps, holes, or other mistakes can be quickly identified and corrected while the welding torch remains engaged and the work-piece is at elevated temperature. Current welding helmets do not provide such functionality.

Another advantage provided by at least one embodiment of the present disclosure is the reduction in neck strain. Typically, a welder will position his or her hands in the preferred position to start the weld and will then quickly nod his or her head so that the welding helmet will rotate and cover the face without losing the positions of the hands. Over time, this action can create neck strain. In at least one embodiment of the present disclosure, the protective welding lens can be placed over the weld area before the precise positioning of hands, eliminating the need for welding helmet and thus eliminating the need to frequently nod the head during welding.

Figure 2:
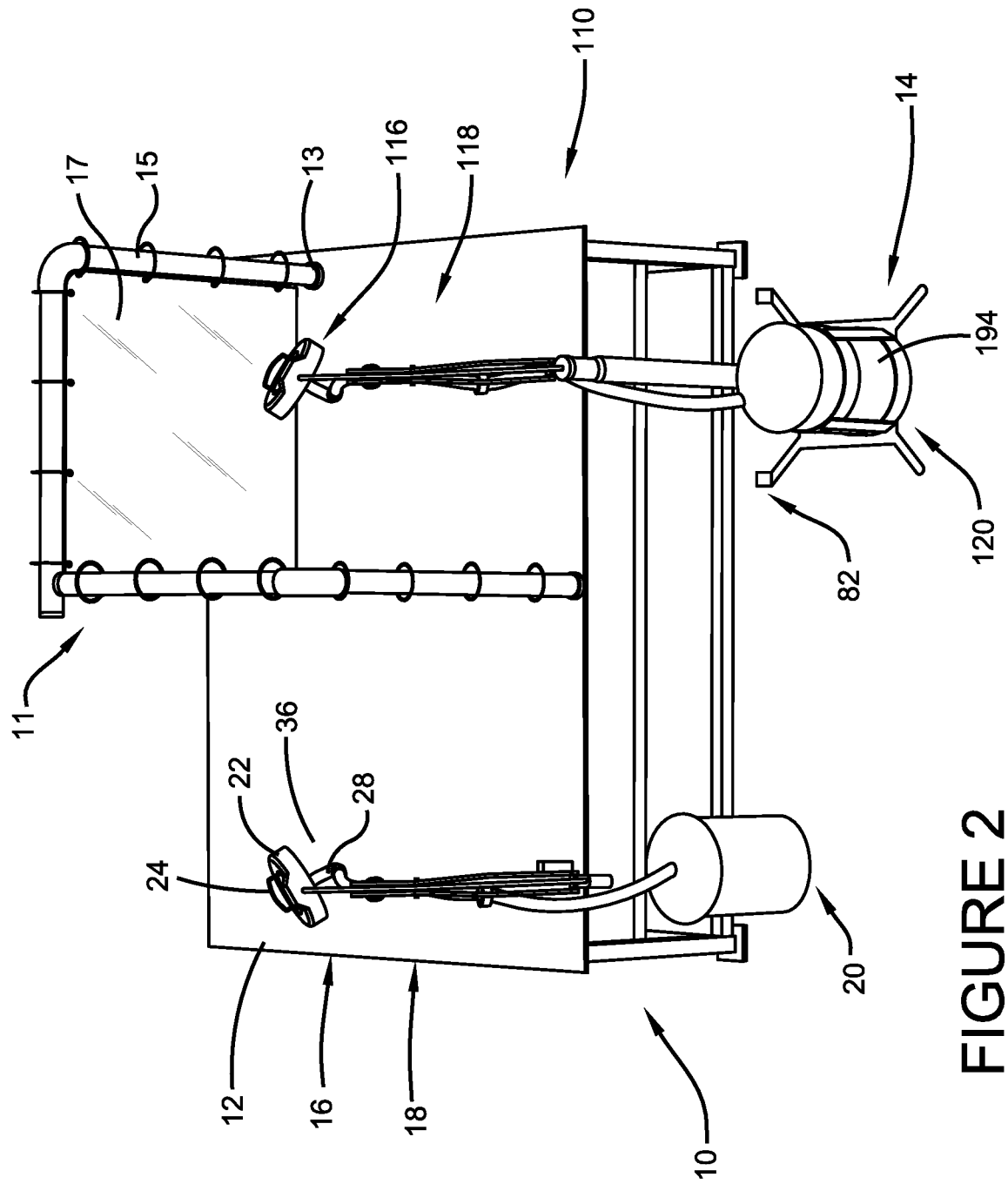
FIG. 2 is a second perspective view of the first and second embodiments of the present disclosure.
Figure 3:
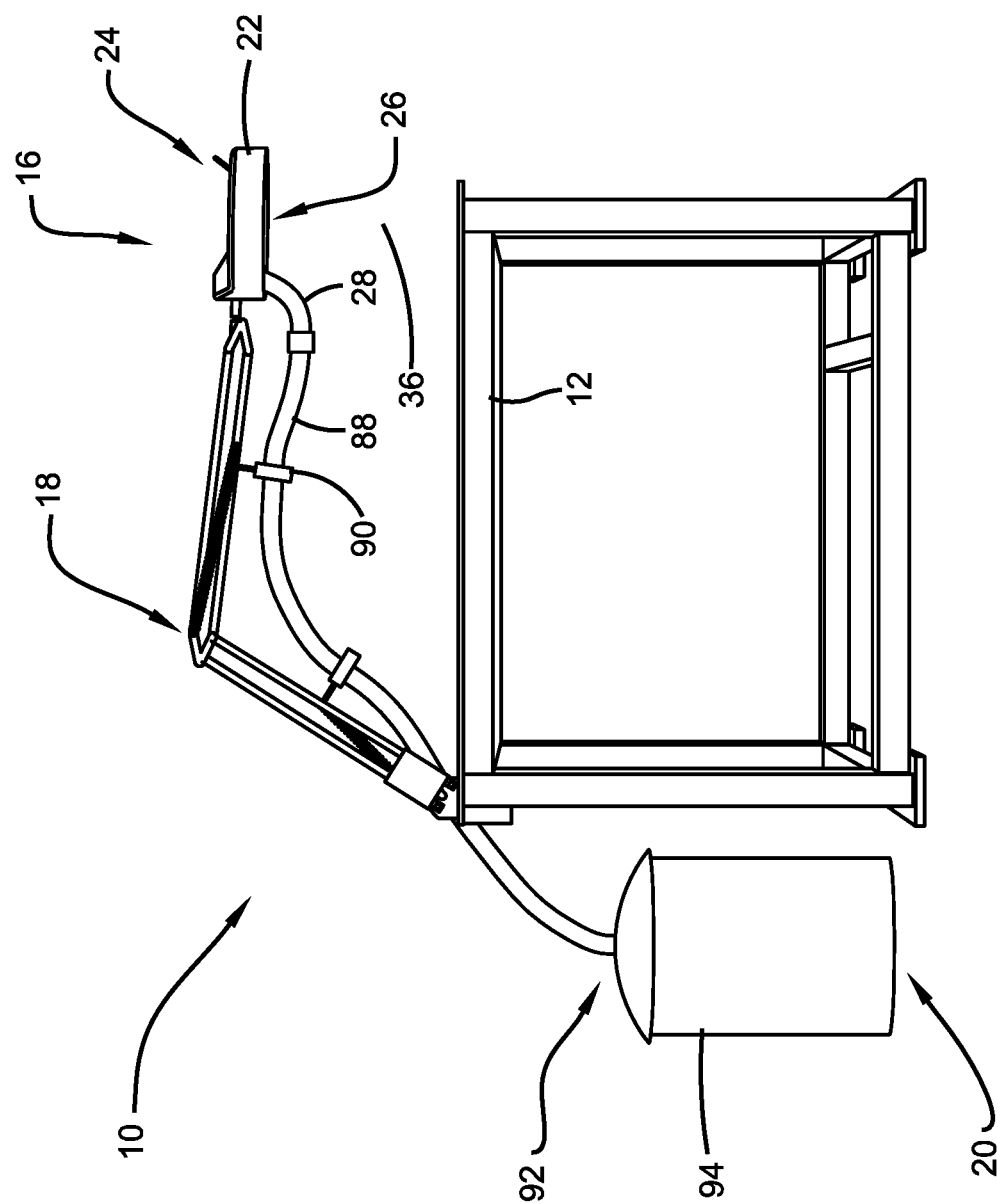
FIG. 3 is a side view of the first embodiment of the present disclosure.

FIGS. 1 and 2 are perspective views of first and second embodiments of the present disclosure. A welding accessory apparatus 10 can be partially mounted on a work table 12. A welding accessory apparatus 110 can be mounted on a dolly 14. The welding accessory apparatus 10 can include a head assembly 16, an arm assembly 18, and a vacuum assembly 20. The welding accessory apparatus 110 can include a head assembly 116, an arm assembly 118, and a vacuum assembly 120. The welding accessory apparatus 10 can be substantially similar to the welding accessory apparatus 110. The head assemblies 16, 116 can be substantially similar. The arm assemblies 18, 118 can be substantially similar. The vacuum assemblies 20, 120 can be substantially similar.

Referring now to FIGS. 1-6, the head assembly 16 can include a outer shell 22, a handle 24 mounted on an outside of the outer shell 22, a manifold 26 positioned within the outer shell 22, a tube 28 projecting from the manifold 26, and a lens assembly 30 mounted within a center aperture 32 of the manifold 26. The lens assembly 30 can be aligned with a center aperture 34 of the outer shell 22 as well. A user can grasp the handle 24 to position the head assembly 16 in the desired position. For example, a work-piece can be positioned at the position referenced at 36 prior to starting welding, under the head assembly 16.

Figure 4:
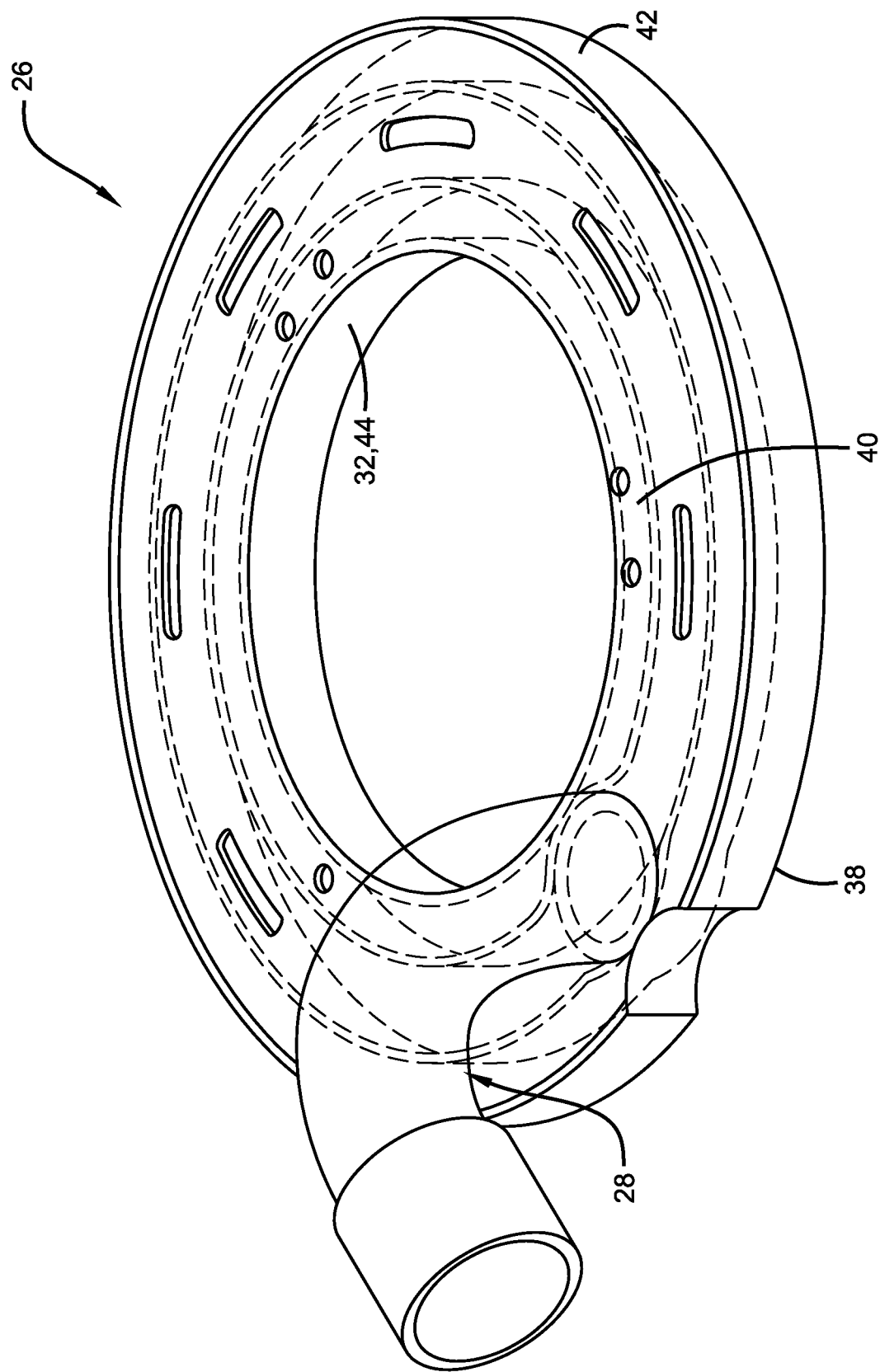
FIG. 4 is a perspective view of a manifold (shown in phantom) according to one or more embodiments of the present disclosure.
Figure 5:
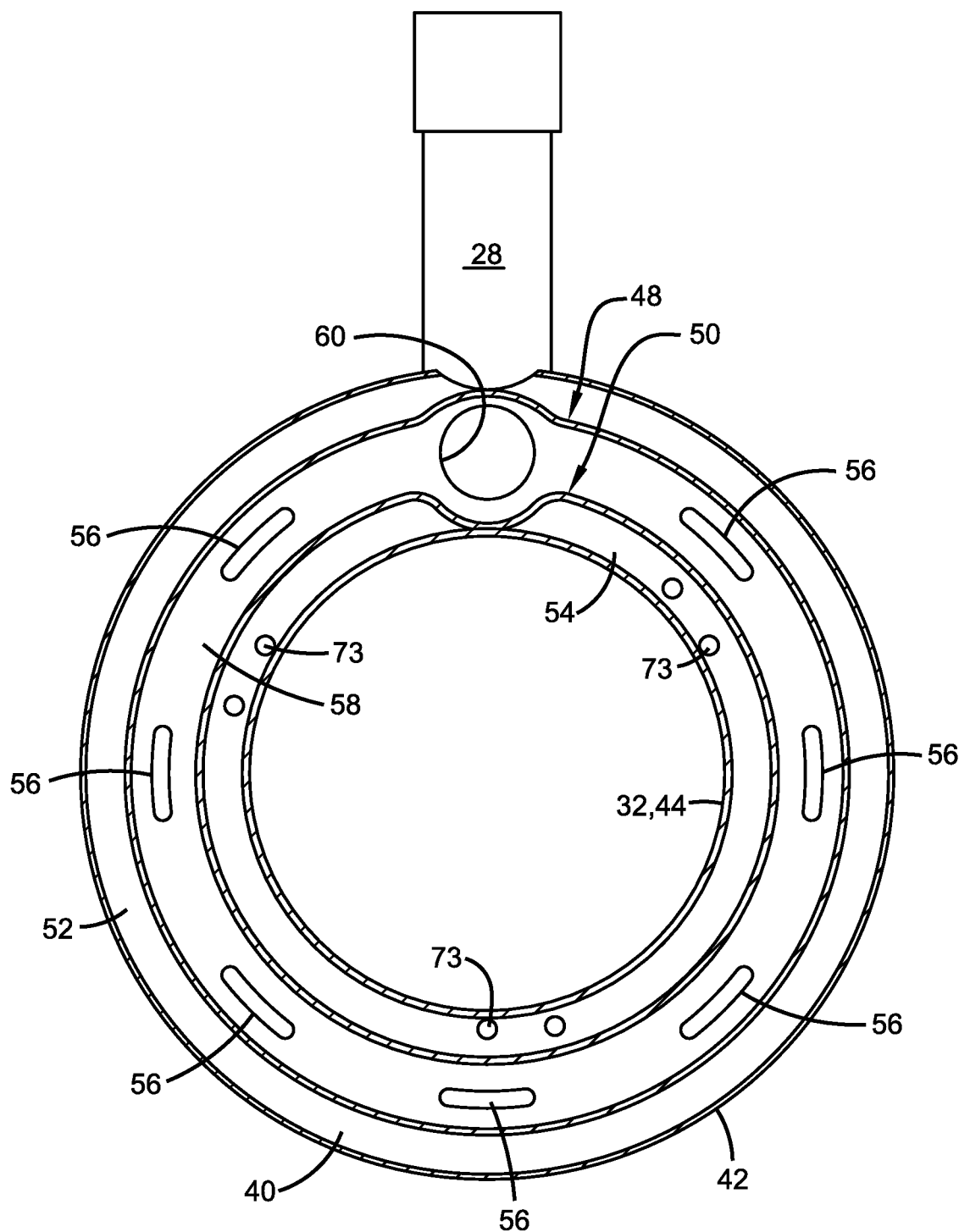
FIG. 5 is a top-down cross-sectional view of the manifold shown in FIG. 4.

FIG. 4 is a perspective view of the manifold 26 shown in phantom. The exemplary manifold 26 includes a top plate 38, a bottom plate 40, and an outer annular wall 42. FIG. 5 is a top-down cross-sectional view of the manifold 26 with the top plate 38 removed. The manifold 26 also includes an inner annular wall 44 that defines the center aperture 32.

Figure 6:
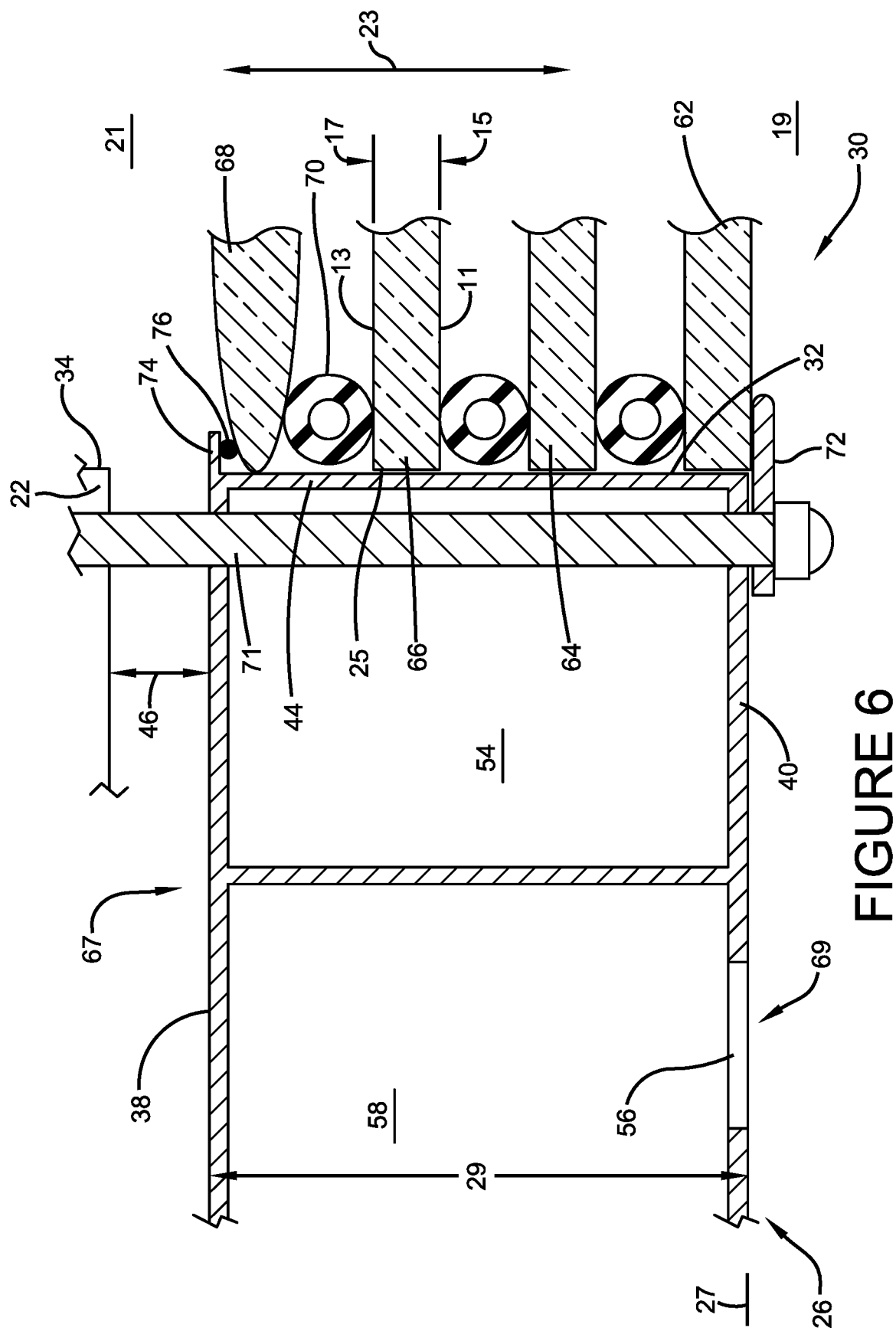
FIG. 6 is a side cross-sectional view of a portion of the head assembly shown in FIGS. 1 and 2 showing an arrangement of lenses within the head.
Figure 12:
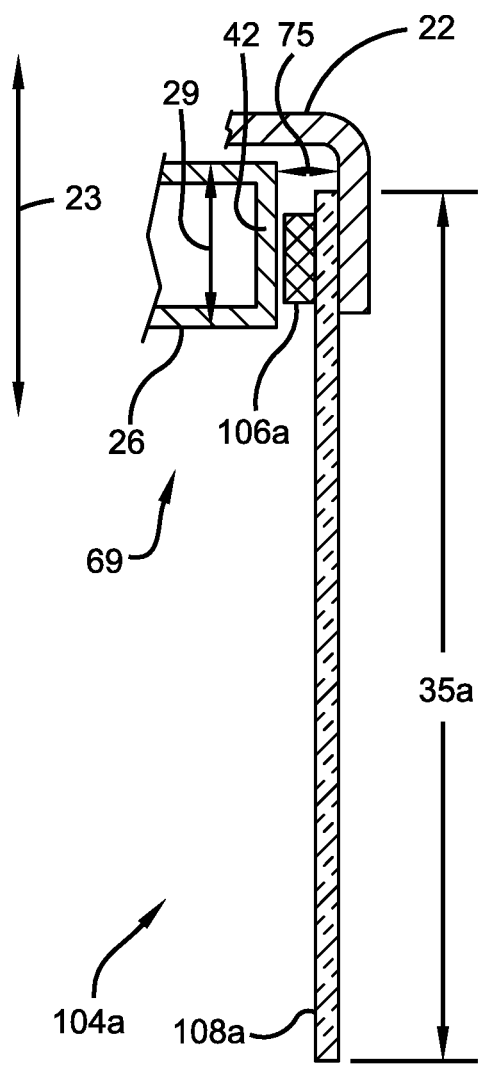
FIG. 12 is a partial cross-sectional view of the shielding strip shown in FIG. 11 in a first configuration.

The bottom plate 40 of the manifold 26 can confront the work-piece during welding. The manifold 26 can be shaped and arranged to enhance thermal resistance to heat being conducted to other portions of the apparatus 10. For example, the top plate 38 of the manifold 26 can be spaced from the outer shell 22. This distance, referenced at 46 in FIG. 6, can be approximately one inch in one or more embodiments of the invention or can be another value in other embodiments. As best shown by FIGS. 6 and 12, the exemplary shell 22 is attached to the manifold 26 through fasteners, such as fastener 71. The fasteners pass through apertures in the manifold 26, such as referenced at 73 in FIG. 5. The exemplary shell 22 covers the upper side of the manifold 26 and laterally covers the outer annular wall 42. The gap 46 is defined between the shell 22 and the upper side and a gap referenced at 75 is defined between the shell 22 and the annular wall 42.

Also, the manifold 26 can define interior cavities to limit the pathways of conductive thermal transfer. As best shown in FIG. 5, the manifold 26 can include first and second interior annular walls 48, 50. A cavity 52 can be formed between the first interior annular wall 48 and the outer annular wall 42. A cavity 54 can be formed between the second interior annular wall 50 and the inner annular wall 44.

The manifold 26 can define an intake for communicating with the vacuum assembly 20. The vacuum assembly 20 can include at least one intake aperture, such as intake aperture 56. A plurality of intake apertures 56 can be defined in the bottom plate 40. As best shown in FIG. 6, the exemplary intake aperture 56 is spaced from the welding lens 66. The intake apertures 56 can communicate with a cavity 58 defined in the manifold 26. The cavity 58 can be defined between the first interior annular wall 48 and the second interior annular wall 50. It is noted that the cavities 52, 54, 58 can be closed by the top plate 38 and the bottom plate 40. An exhaust aperture 60 can also be defined in the bottom plate 40. As best shown in FIGS. 5 and 6, the exemplary outlet aperture 60 is spaced from the intake aperture 56 and the welding lens 66. The exemplary internal cavity 58 communicates with the intake apertures 56 and the outlet aperture 60. The exhaust aperture 60 can fluidly communicate with the tube 28. The tube 28 can be interconnected with the manifold 26 and can communicate with the intake apertures 56 and the internal cavity 58 by way of the outlet aperture 60. A vacuum drawn by the vacuum system 20 can cause air including fumes, odors, and gases to be drawn through the intake apertures 56, through the cavity 58, through the exhaust aperture 60, and into the tube 28.

As best shown in FIG. 6, the lens assembly 30 can include a shield lens 62 positioned closest to the work-piece. The shield lens 62 can protect the other lenses of the lens assembly 30. The lens assembly 30 can also include a colored lens 64. The colored lens 64 can be shaded purple, blue, green or any other color that is functionally appropriate. The colored lens 64 can enhance the visual clarity provided by the lens assembly 30. The lens assembly 30 can also include a welding lens 66. The welding lens 66 can possess the same attributes of a welding lens in a welding helmet in protecting the eyes of the welder. However, the welding lens 66 can be circular, in contrast to being rectangular as found in current welding helmets. The lens assembly 30 can also include a magnifying lens 68. The magnifying lens 68 can produce a magnified image of the work-piece during welding. The lenses 62, 64, 66, 68 can be circular and can be separated by pliable gasket members, such as gasket member 70. The lens assembly 30 can be mounted in the manifold 26 between a plurality of rotatable clips 72 and a stop 74. A pliable member 76 is shown between the magnifying lens 68 and the stop 74.

The welding lens 66 can be configured to filter at least one of ultraviolet, infrared, and visible light to a shade number of at least two. Electromagnetic energy given off by an arc or flame can injure workers' eyes and is commonly referred to as radiant energy or light radiation. For protection from radiant energy, workers must use personal protective equipment, such as safety glasses, goggles, welding helmets, or welding face shields. This equipment must have filter lens or welding lens with a shade number that provides the appropriate level of protection. The "shade number" indicates the intensity of light radiation that is allowed to pass through a filter lens to one's eyes. Therefore, the higher the shade number, the darker the filter and the less light radiation that will pass through the lens. The Occupational Safety and Health Administration (OSHA) has established guidelines for the minimum protective shade number, which can be found at https://www.osha.gov/Publications/OSHAfactsheet-eyeprotection-during-welding.pdf. The range of minimum protective shade numbers for various kinds of welding ranges from two to fourteen. Embodiments of the present disclosure can be practiced with one or more welding lens' defining shade number(s) of any value along this range.

The welding lens 66 can define a first surface 11 in a first plane 15 on a work-piece side and a second surface 13 in second plane on an operator side. As shown by comparing the various figures, a widest cross-section of the welding lens 66 extends in the first plane 15 in the exemplary embodiment of the present disclosure. The first plane 15 is referenced at 15 and the second plane is referenced at 17. The work-piece side is referenced at 19 and the operator side is referenced at 21. The work-piece being subjected to welding will be positioned on the work-piece side 19 of the welding lens 66. An operator will be viewing the work-piece during welding through the lens' 62, 64, 66, 68, on the operator side 21 of the welding lens 66. The welding lens 66 need not be flat on both sides or on either side as shown in the exemplary embodiment.

The first plane 15 and the second plane 17 can be spaced from one another along a viewing axis 23 passing through the welding lens 66. The exemplary welding lens 66 is centered on the viewing axis 23. The one or more intake apertures 56 can be positioned proximate to the welding lens 66. For example, as shown in FIGS. 5 and 6, the at least one intake aperture 56 can be further defined as a plurality of intake apertures 56 positioned about a periphery 25 of the welding lens 66. The periphery 25 can be concentric with the center aperture 32 and extend about the viewing axis 23. At least some of the plurality of intake apertures 56 can be evenly spaced about the periphery 25 of the welding lens 66.

At least one intake aperture 56 can at least partially extend in a third plane. The third plane is referenced at 27. The third plane 27 can be one of parallel to and coplanar with at least one of the first plane 15 and the second plane 17. The exemplary third plane 27 is parallel to both of the first plane 15 and the second plane 17, but can be different in other embodiments of the present disclosure. The exemplary third plane 27 is positioned closer to the first plane 15 than the second plane 17. The exemplary first plane 15 is positioned between the exemplary third plane 27 and the exemplary second plane 17 along the viewing axis 23. The first plane 15 and the third plane 27 could be substantially coplanar. For example, an embodiment of the present disclosure could omit the lens 62 and the lens 64 and could reduce a height of the manifold 26 (referenced at 29) such that the first plane 15 and the third plane 27 could be substantially coplanar. The height 29 of the manifold 26 is defined along the viewing axis 23.

Figure 7:
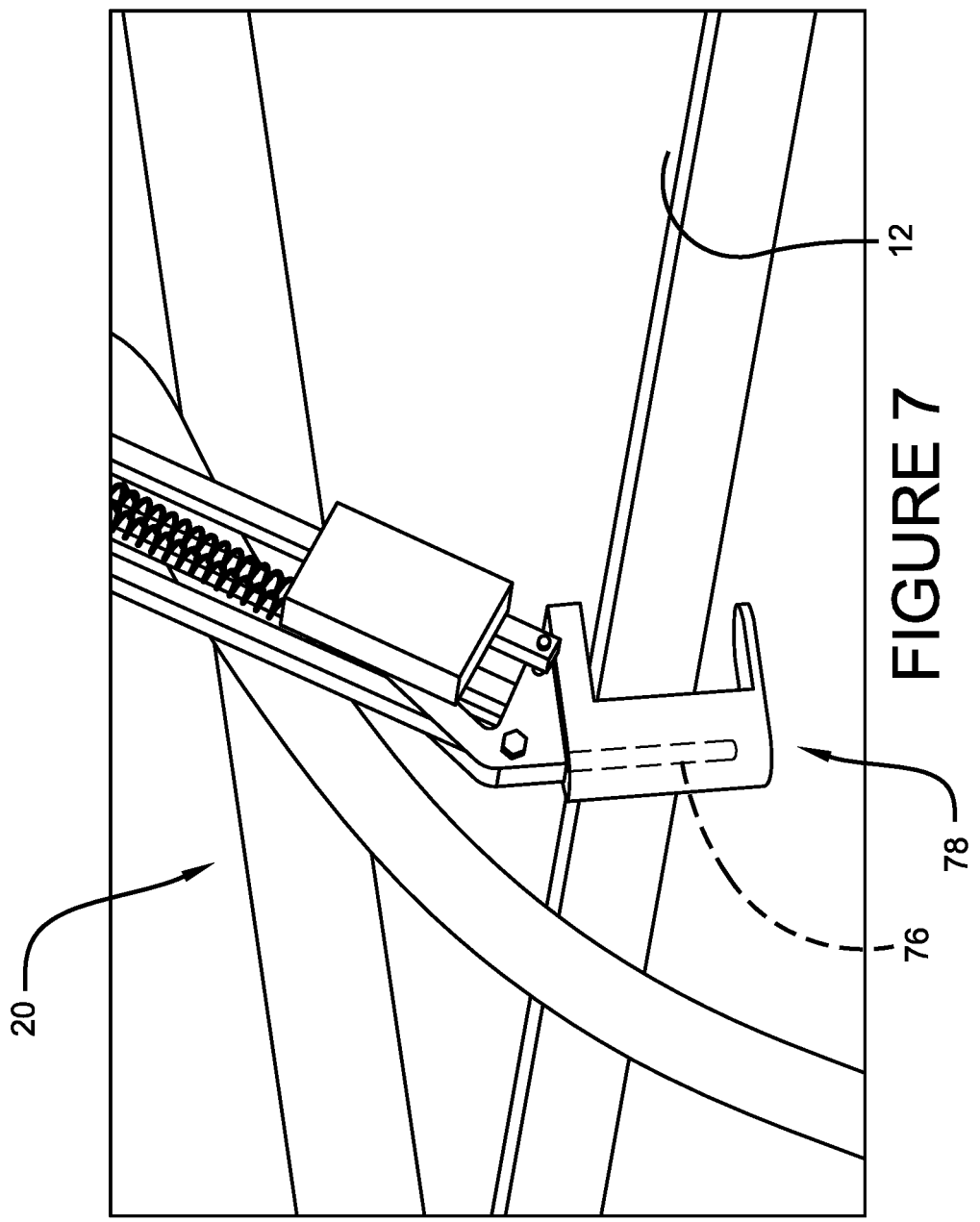
FIG. 7 is a magnified view of an arm assembly mounted on a table clamp according to one or more embodiments of the present disclosure.

The head assembly 16 is mounted to the arm assembly 18. The arm assembly 18 can permit infinitely adjustable positioning of the head assembly within a range defined by the overall length of the arm assembly 18. Upon positioning the head assembly 16 as desired, the arm assembly 18 can hold the head assembly 16 in the desired position. The arm assembly 18 can apply known designs used in magnifying lamps. The articulated arm assembly 18, like magnifying lamps, is adjustable by hand, without motors, and is configured such that the welding lens 66 and the intake aperture 56 are jointly moveable among a plurality of different positions selectable by a user. The articulated arm assembly 18, like magnifying lamps, is thus configured to retain the welding lens 66 and the intake aperture 56 in any one of the plurality of different positions after the user's selection. FIG. 7 shows that the arm assembly 18 can include a peg 76 that can be received in a table clamp 78. The peg 76 is received in an aperture of the clamp 78. The clamp 78 is selectively engageable with a structure such as the work table 12. The peg 76 is selectively insertable in the aperture of the clamp 78. The peg 76 can also be used to mount the arm assembly 20 in the dolly 14.

The arm assembly 18 can be an articulated arm assembly. In an embodiment of the present disclosure, the welding lens 66 and the at least one intake aperture 56 can be mounted for adjustable positioning on the articulated arm assembly 18. U.S. Pat. Nos. 5,613,771; 5,170,975; 4,953,822; 4,852,842; 3,790,773 disclose various articulated arm assemblies and, to the extent such disclosures are consistent with the present disclosure, are hereby incorporated by reference.

Referring again to FIG. 1, the dolly 14 can include a base 80, wheel mounts such as wheel mount 82 extending from the base 80, a telescoping post 84 mounted on the base 80, and a cage 86 mounted on the base 80. The dolly 14 can be tilted onto wheels (not shown) and moved to a desired position. The peg 76 can be received in the telescoping post 84. The telescoping post 84 can allow a position of the base of the arm assembly 18 to be vertically adjustable. The cage 86 can receive and hold a portion of the vacuum assembly 20.

Referring again to FIG. 3, the vacuum assembly 20 can include a flexible hose 88 connected to the tube 28, one or more clamps such as clamp 90 to mount, or hang, the hose 88 on the arm assembly 18, a vacuum device 92 drawing a vacuum through the hose 88, and a container 94 to retain particulates drawn by the vacuum and arising from welding. The vacuum device 92 can draw fumes and gases away from the workstation and thus from the human welder. Removing the fumes also inhibits the accumulation of soot and debris on the welding lens assembly 30. The hose 88 can be supported on and extend along a length of the articulated arm assembly 18. FIGS. 1 and 2 show a container 194 of the vacuum assembly 120 held in the cage 86 of the dolly 14. As shown in the various figures, the hose 88 is in fluid communication with the intake apertures in the exemplary embodiment of the present disclosure. The vacuum device 92 is thus interconnected with the hose 88 and configured to draw vacuum through the intake apertures 56 in the manifold 26, by way of the internal cavity 58, the outlet aperture 60, the tube 28, and the hose 88.

Figure 8:
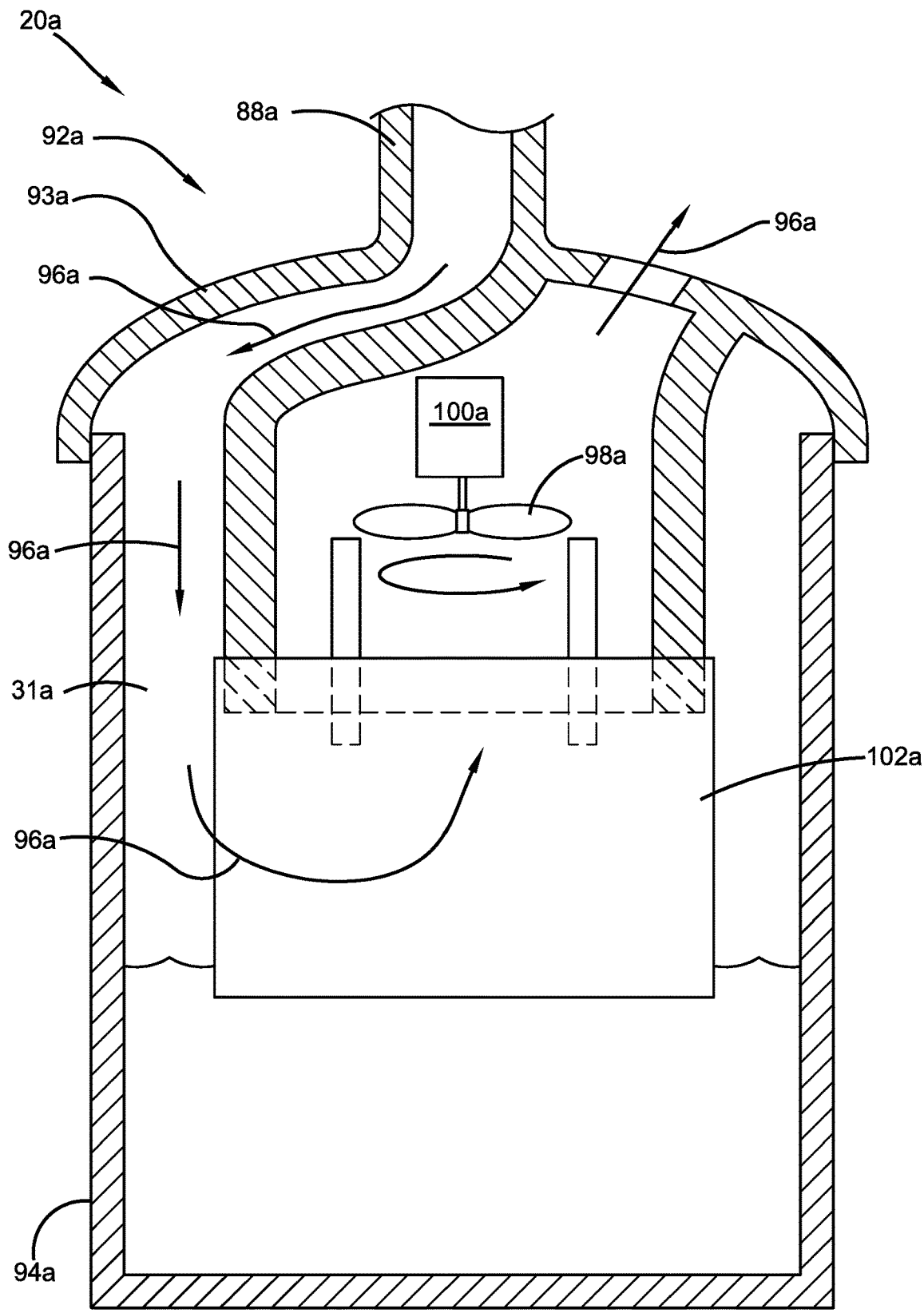
FIG. 8 is a partial cross-section of a portion of a vacuum assembly according to one or more embodiments of the present disclosure.

FIG. 8 shows an alternative embodiment of a vacuum assembly 20a. A hose 88a communicates air driven in motion by vacuum to a vacuum device 92a. The vacuum device 92a can include a case 93a, a fan 98a, and a motor 100a. The case 93a can house the fan 98a and the motor 100a and can define air passageways for controlling the flow of air. The movement of air is referenced by arrows 96a. The air can pass into a container 94a and be drawn through the fan 98a. The fan 98a can be driven in rotation by the motor 100a.

A filter 102a can prevent particulates from passing to the fan 98a in the air stream 96a. The container 94a can include an interior 31a in fluid communication with the at least one intake aperture (referenced at 56 in other Figures). The container 94a can be configured to accumulate debris drawn into the at least one intake aperture. The container 94a can be configured to hold a quantity of water. The container 94a can be partially filled with water. The water can wick through the filter 102a so that any sparks passing through the vacuum assembly 20 are extinguished upon contact with the filter 102a. The container 94a can be opaque so that the water level is visible from the outside of the container 94a. Further, a visible line of a preferred water level can be disposed on the outside of the container 94a.

The manifold 26 can surround the welding lens 66 and define the cavity 54 and the cavity 58. The cavity 54 can be positioned closer to the welding lens 66 than the cavity 58. The at least one intake aperture 56 can fluidly communicating directly with the cavity 58. The at least one intake aperture 56 can be fluidly isolated from the cavity 54. The cavity 54 can thermally insulate the welding lens 66 from the hot gases and sparks that travel through the air intake aperture 56. The cavity 52 of the manifold can be outside of the cavity and can thermally insulate the shell 22 from the hot gases and sparks that travel through the air intake aperture 56.

The exemplary articulated arm assembly 18 is interconnected with the manifold 26 and is configured to be adjustable by hand whereby a user can position the manifold 26 and the welding lens 66 among a plurality of different positions and orientations in three dimensions and the articulated arm assembly 18 retains the manifold 26 and the welding lens 66 in the position and orientation selected by the user. The exemplary tube 28 can be moved and held in place with the manifold 26 and the welding lens 66 by the articulated arm assembly 18.

Figure 9:
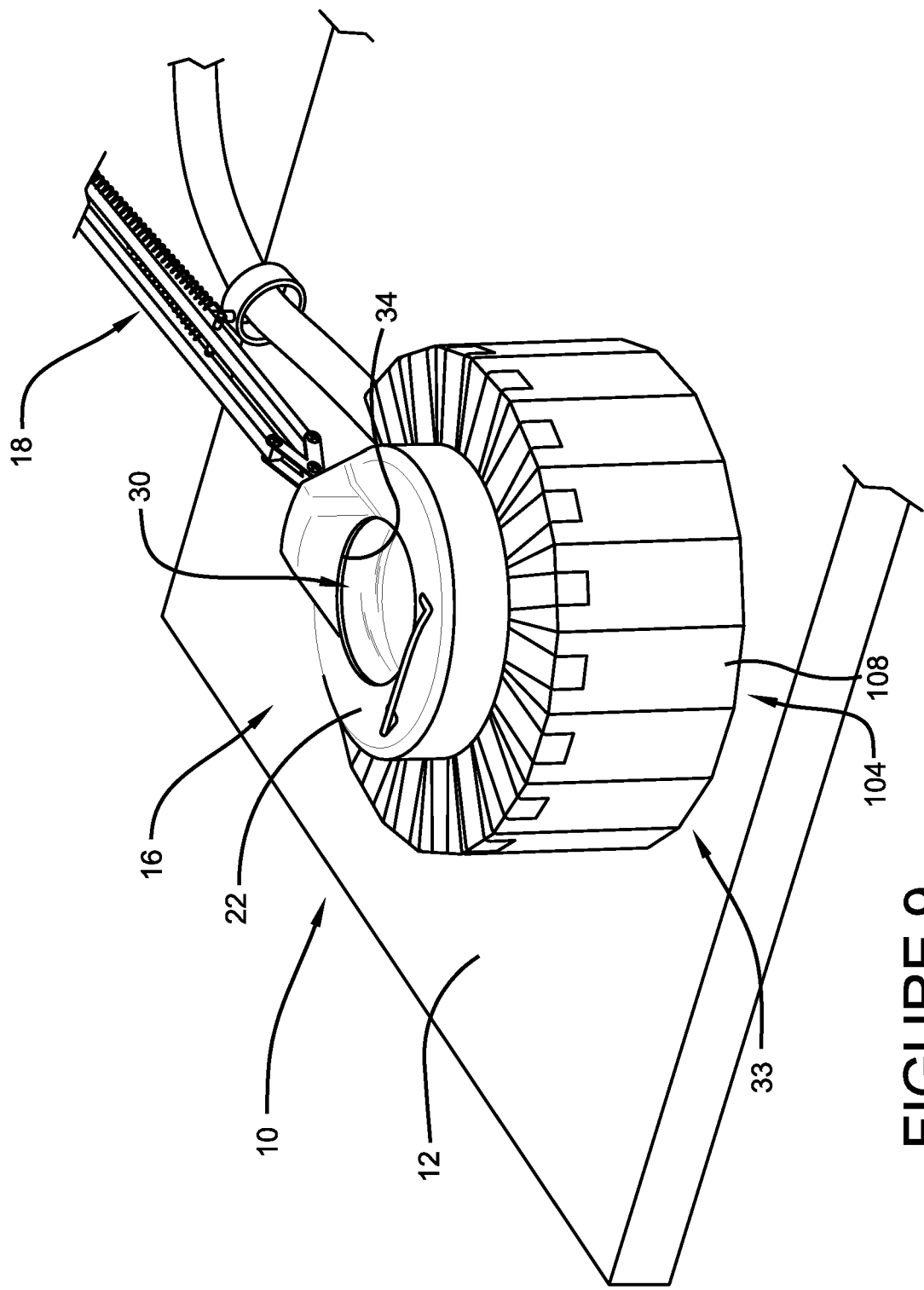
FIG. 9 is a magnified view of a head with a plurality of shielding strips mounted on the head.
Figure 10:
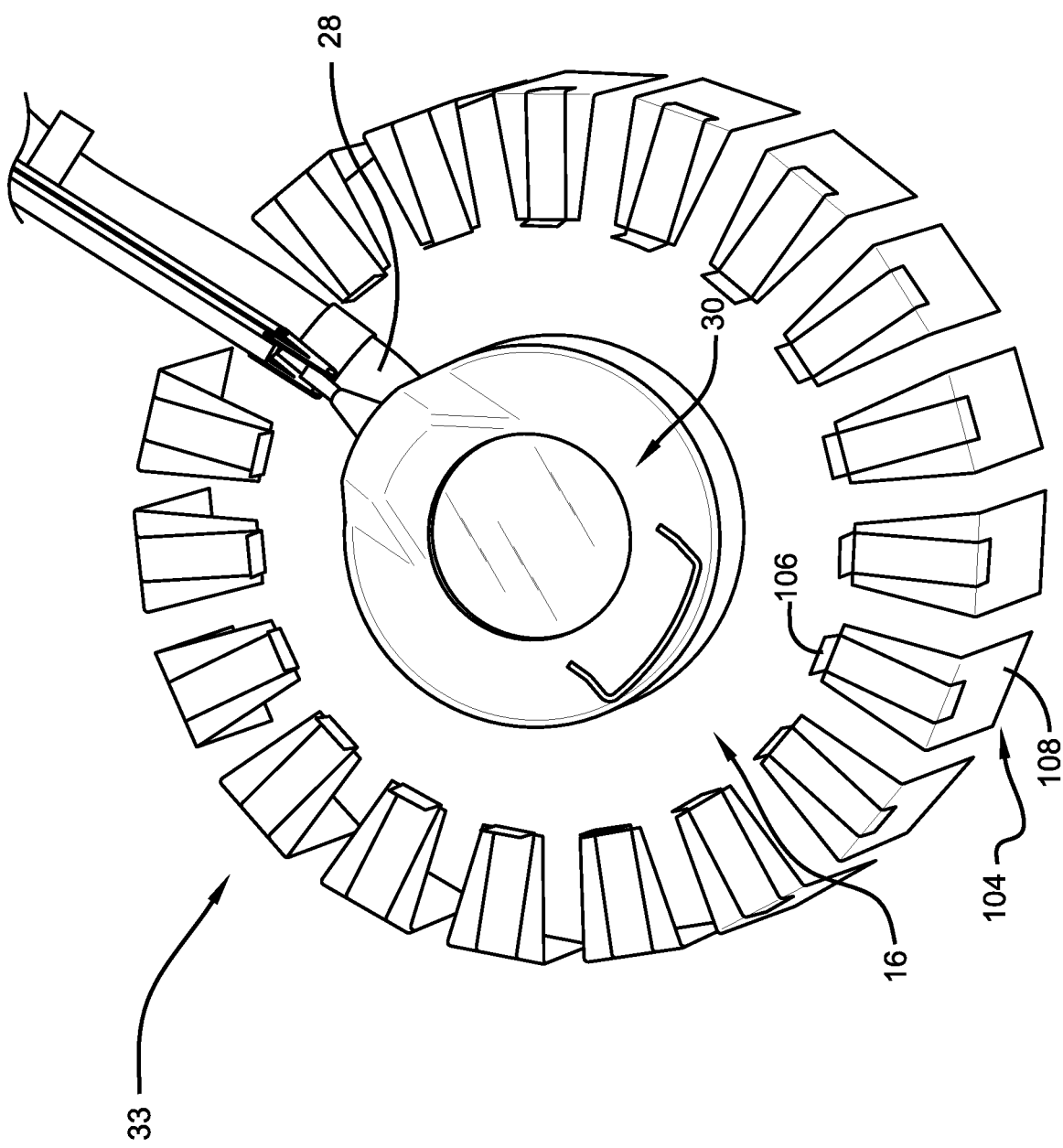
FIG. 10 is an exploded view of FIG. 9.

Referring now to FIGS. 9 and 10, the weld accessory apparatus 10 can include a flexible curtain 33 positioned proximate to the welding lens 66. The exemplary flexible curtain 33 is shown in exploded view in FIG. 10. The flexible curtain 33 can be proximate to the at least one air intake aperture 56. The exemplary flexible curtain 33 extends around the manifold 26. The curtain 33, with the work table 12, can thus encloses a volume of space defining the work space. The work space is the where the welding torch flame is present and where fumes are generated. The curtain 33 inhibits the flow of fumes away from the work area and also prevents arc-flash from interfering with welders who are welding next to the workstation utilizing the apparatus 10. Preferably, all welders are utilizing apparatus' 10. The flexible curtain 33 can be configured to provide protection from sparks and spatter generated during welding. Various materials for forming the flexible curtain 33 can be acquired under the "Z-Shield™ Welding" brand of Newtex Industries, Inc. The flexible curtain 33 can also be formed from Velvet Shield® material, developed by Nitser Technologies.

The flexible curtain 33 can be positioned radially-outward of the at least one intake aperture 56 and the periphery 25 relative to the viewing axis 23. In an embodiment of the present disclosure, the welding lens 66 and the at least one intake aperture 56 and the flexible curtain 33 can be mounted for adjustable positioning on the articulated arm assembly 18. The flexible curtain 33 can be releasibly mounted to the shell 22. The exemplary flexible curtain 33 is thus moved and held in place with the manifold 26 and the welding lens 66 by the articulated arm assembly 18. In one or more embodiments, the flexible curtain 33 can be releasibly mounted to the shell 22 with at least one magnet to releasably attach the curtain 33 to the shell 22.

The exemplary flexible curtain 33 can include one or more shielding strip assemblies 104 positioned adjacent to one another about the periphery 25 of the welding lens 66. Each shielding strip assembly 104 can include a fastening member 106 affixed to a strip 108 of shielding material. The fastening member 106 can be permanently magnetized. Fastening members other than magnets can be applied in other embodiments of the present disclosure, such as clamps, clips, hooks, screws, or any other kind of fastener. The shielding material can be a polyvinyl chloride plastic film or fabric and can be configured to provide protection from sparks and spatter generated during welding. Various materials for forming the strip 108 can be acquired under the "Z-Shield™ Welding" brand of Newtex Industries, Inc. The strip 108 can be a narrow piece, comparatively long and of generally uniform width. In operation, less than the full periphery 25 can be shielded by the flexible curtain 33.

The exemplary magnetic fastening member 106 can be affixed to the outer shell 22, on the outside of the outer shell 22 or on the inside of the outer shell 22 between the outer shell 22 and the manifold 26. The magnetic fastening member 106 can allow the strips 108 to partially overlap or be adjacent to one another. This can also help prevent arc-flash from interfering with welders who are welding next to the workstation utilizing the apparatus 10. In FIGS. 9 and 10, shield strip assemblies are positioned to circumscribe the work-piece during welding. An exemplary shield strip assembly 104 includes a magnet affixed to a bracket 106 and a strip 108 of shielding material. The bracket 106 can include a horizontal portion, an upwardly-directed portion, and a downwardly-directed portion. The magnet can be mounted on the upwardly-directed portion. The magnet and the upwardly-directed portion can be positioned against an inner surface of the outer shell 22, the magnet releasably affixing the shield strip assembly 104 and the outer shell 22.

Figure 11:
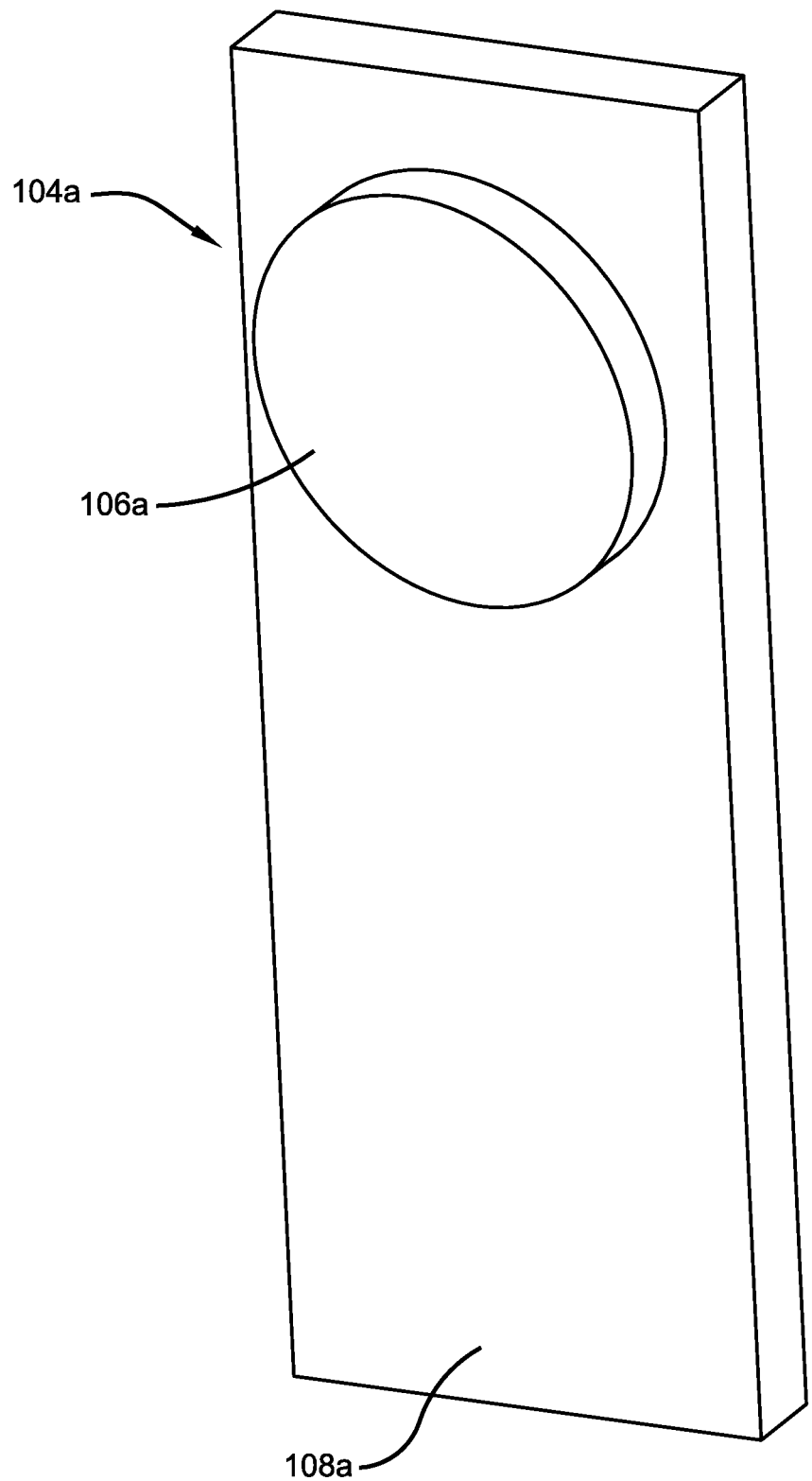
FIG. 11 is a perspective view of an alternative shielding strip according to one or more embodiments of the present disclosure.

In FIG. 11, an exemplary shield strip assembly 104a includes a magnet shaped as a circle 106a and a strip 108a of shielding material. The shield strip assembly 104a can be desirable because the strip 108a can be folded over on itself one or more times to reversibly-adjust the length of the strip 108a.

Figure 13:
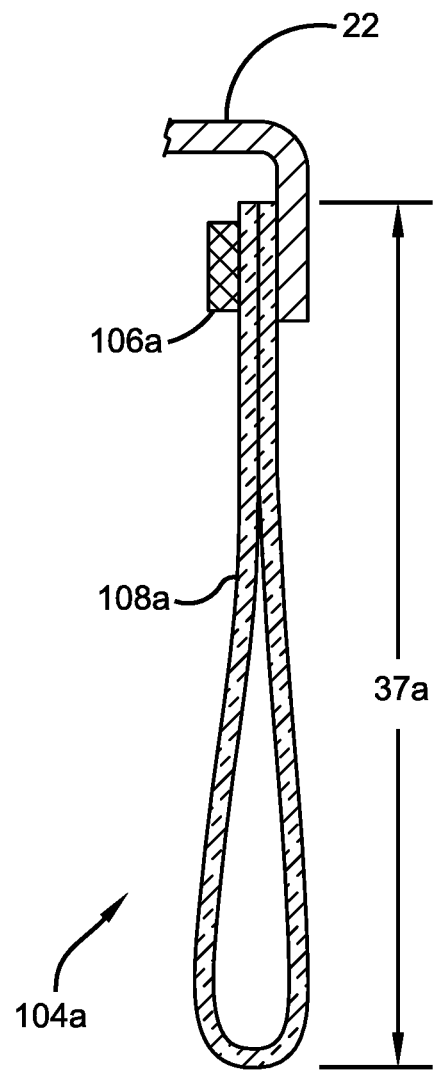
FIG. 13 is a partial cross-sectional view of the shielding strip shown in FIG. 11 in a second configuration.

The shielding strip 108a can be foldable such that a variable portion of a length of the at least one shielding strip 108a is positionable between the fastening member and the shell 22. FIG. 12 shows a full length of the shielding strip 108a defining a height of a flexible curtain, referenced at 35a. Comparing FIGS. 6 and 12 shows that the intake aperture 56 can be positioned adjacent to the periphery 25 in a plane that is transverse to the flexible curtain 33 (which includes the strip 108a) in the exemplary embodiment of the present disclosure. FIG. 13 shows the shielding strip 108a folded in half, reducing the height 35a in half to a height 37a. The respective heights 35a or 37a of the flexible curtain 33 are defined along the viewing axis 23. The height of the exemplary curtain 33 is adjustable and can always be greater than the height 29 of the manifold 26. The exemplary heights 35a, 37a are both greater than twice the height 29 of the manifold 26. It is noted that the present disclosure is not limited to any particular height for the curtain.

The apparatus 10 can be used with additional shielding structures. For example, as best shown in FIGS. 1 and 2, a curtain assembly 11 can include a magnetic base 13, a frame member 15 mounted in the magnetic base 13, and a curtain 17 hanging on the frame member 15. The magnetic base 13 can be sized and have magnetic strength sufficient to support the frame member 15 and the curtain 17. The exemplary frame member 15 is L-shaped, but other embodiments can be shaped differently, such as U-shaped or shaped to extend in different planes. The curtain 17 can be shielding material formed from polyvinyl chloride plastic film.

In one or more other embodiments of the present disclosure, the lens assembly 30 can be replaced or a portion of the lens assembly 30 can be replaced with an auto-darkening welding lens. For example, the welding lens 66 can be an auto-darkening lens. Such a lens could have the same shape as the lens 66. Non-circular examples of such lens include Radnor® 2"×4¼" Fixed Shade 10 Auto-Darkening Welding Lens For Lift Front Welding Helmets, Airgas Part #:RAD64005105; ArcOne Singles HD Shade 10 2"×4¼" Retro Fit A, ArcOne S240-10 (https://weldingsupply.com/cgi-bin/einstein.pl?PNUM::1:UNDEF:X:S240-10); Miller Auto-Darkening Welding Lens—2×4 Fixed Shade 9 770659. These exemplary, existing rectangular lens' can be formed with circular perimeter and be incorporated in one or more embodiments of the present disclosure. It is noted that rectangular auto-lens' are not excluded from the scope of the present disclosure.

Figure 14:
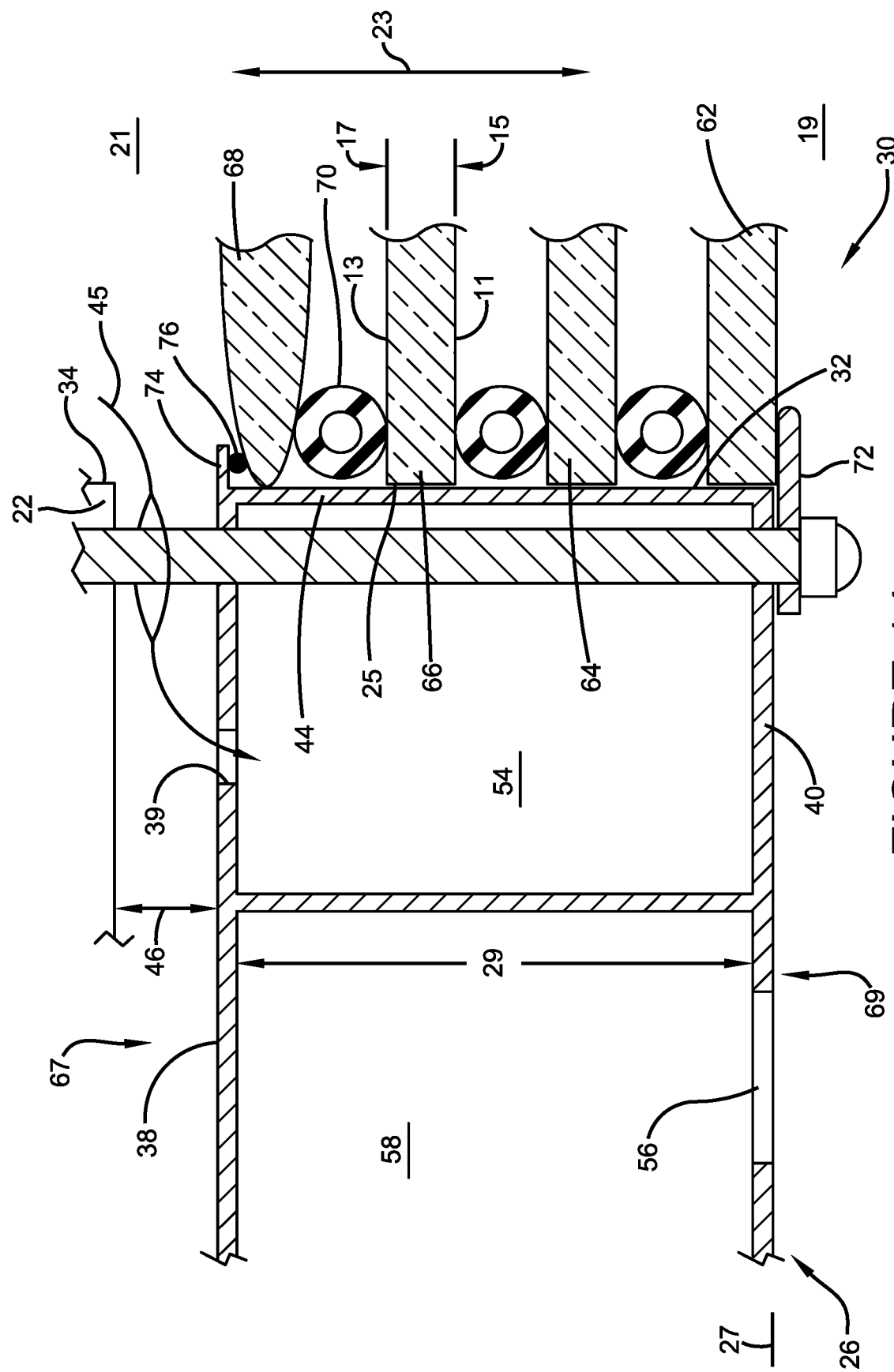
FIG. 14 is a side cross-sectional view of a portion of a head assembly, similar to FIG. 6, but of an alternative embodiment of the present disclosure.
Figure 15:
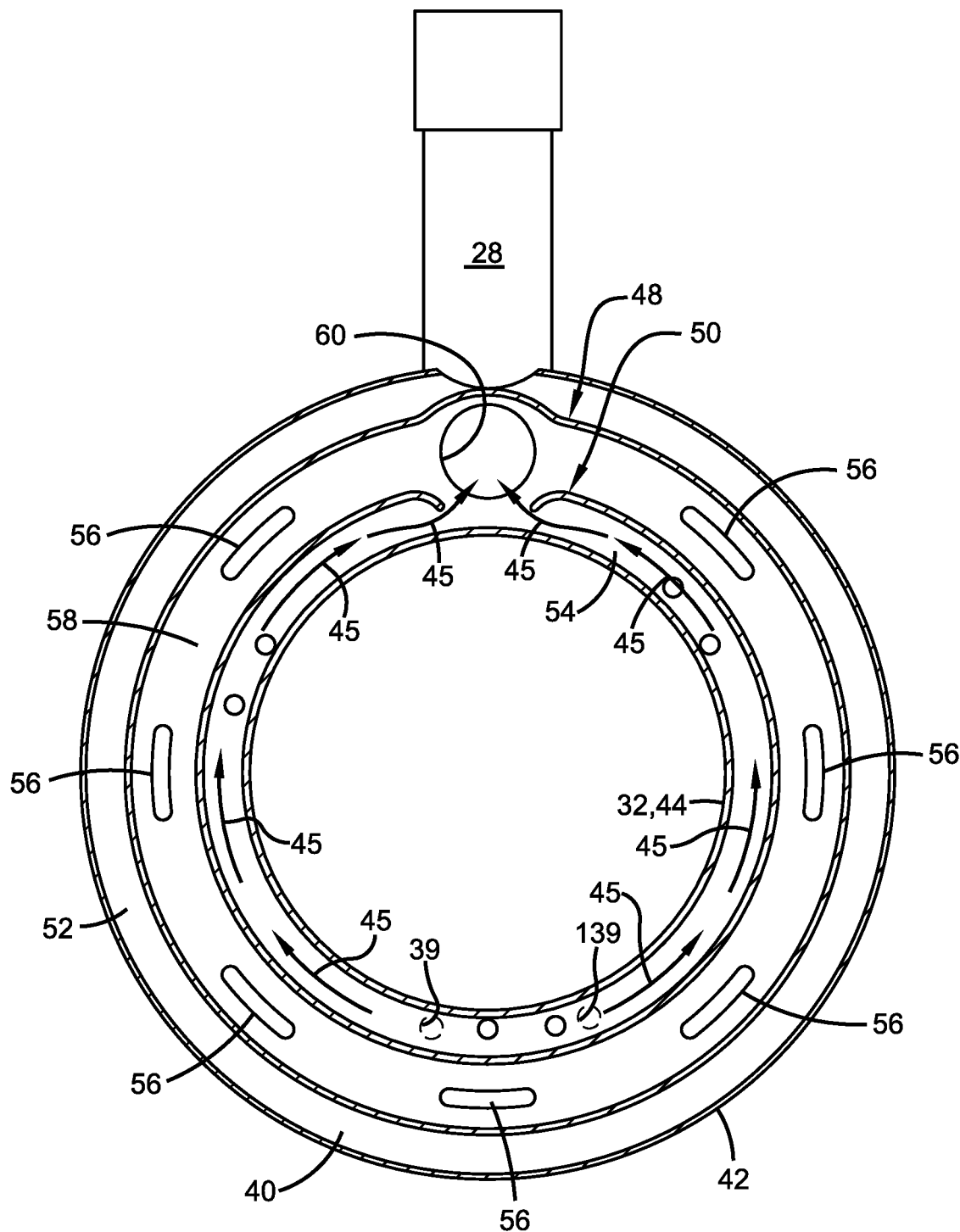
FIG. 15 is a top-down cross-sectional view of a manifold, similar to FIG. 5, but of the alternative embodiment also shown in FIG. 14.

Referring now to FIGS. 14-17, in one or more other embodiments of the present disclosure, the lens assembly 30 and/or an auto-darkening welding lens can be cooled during use. FIGS. 14 and 15 are respectively similar to FIGS. 6 and 5 and the reference numerals from FIGS. 6 and 5 have been retained. FIG. 14 shows the manifold 26 including a cooling aperture 39 for receiving air from above the side of the head assembly 16 opposite to the work-piece side, the "second" side of the manifold 26 and referenced at 67. The work-piece side of the manifold 26 can be referred to as a "first" side and is referenced at 69. The first side 69 is configured to face toward a workpiece subjected to welding and the second side 67 is opposite to the first side and is configured to face away from the workpiece subjected to welding. FIG. 15 shows the aperture 39 and another aperture 139 which is also open to a top side of the manifold 26. It is noted that the apertures 39, 139 are shown in FIG. 15 to make their positions clear relative to the apertures 56 and 60, but the exemplary apertures 39, 139 would be defined in the top plate 38 and therefore not visible in FIG. 15.

The exemplary cooling apertures 39, 139 are spaced from the exemplary intake apertures 56, the exemplary welding lens 66, and the exemplary outlet aperture 60.

Figure 16:
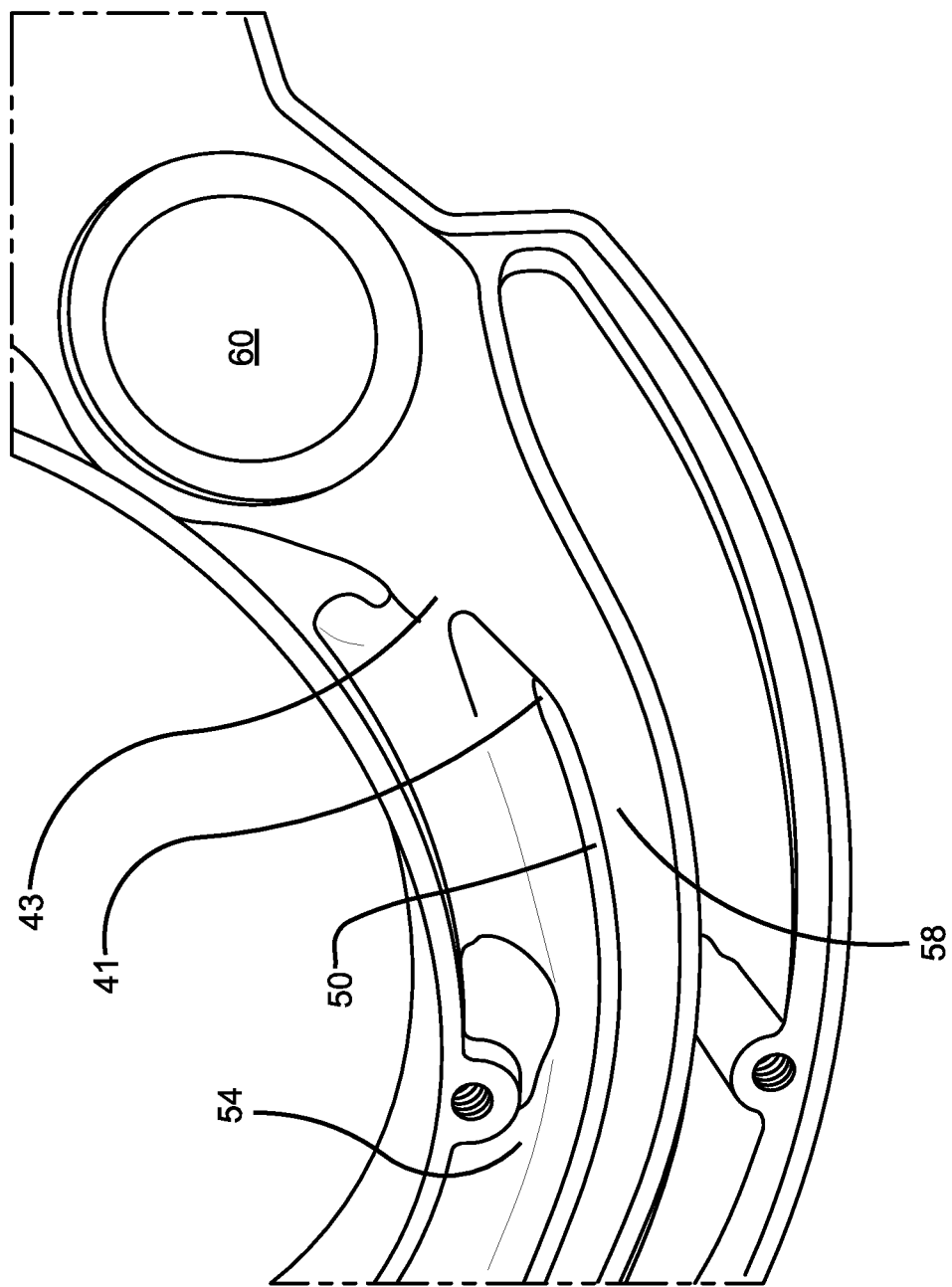
FIG. 16 is a first perspective view of an exemplary manifold with a top plate removed to expose an interior of the manifold.
Figure 17:
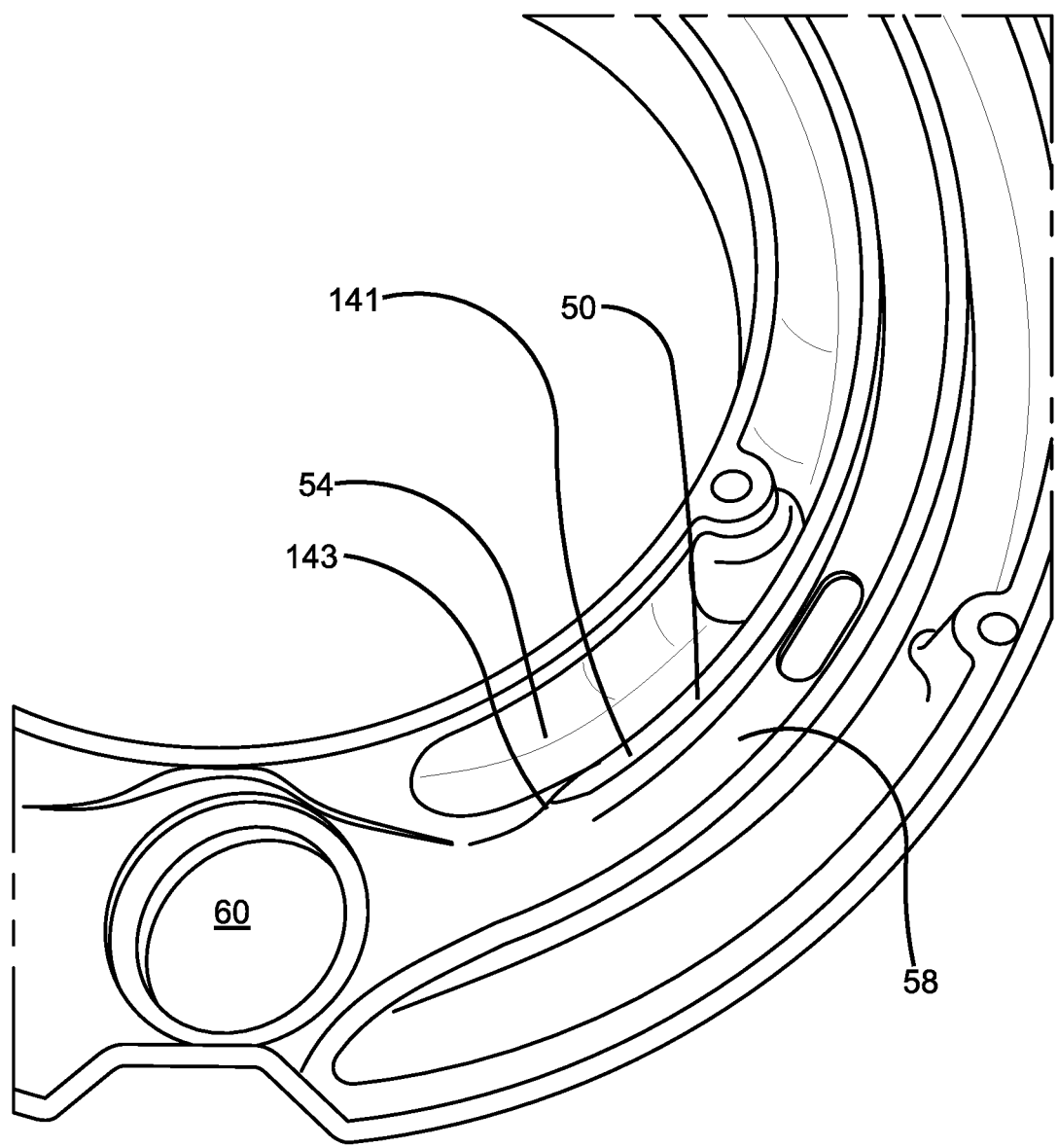
FIG. 17 is a second perspective view of the exemplary manifold with the top plate removed to expose the interior of the manifold.

The manifold 26 shown in FIGS. 1-13 has been further modified as shown best in FIGS. 15-17. The interior wall 50 has been truncated near the exhaust aperture 60 to allow the cavities 54 and 58 to communicate with the exhaust aperture 60. The exemplary wall 50 extends away from the top plate 38 generally at positions referenced at 41 and 141 in FIGS. 16 and 17, creating communication between the cavities 54 and 58. In the exemplary embodiment, the wall 50 ends generally at positions referenced at 43 and 143 in FIGS. 16 and 17, at the bottom surfaces of the cavities 54, 58.

The vacuum assembly 20 can draw air through the apertures 39, 139 to cool the lens assembly 30 and/or an auto-darkening welding lens. The air can be drawn into the exhaust aperture 60. Arrows referenced at 45 represent the flow of cooling air. The exemplary internal cavity 54 communicates with the cooling apertures 39, 139 and the at least one outlet aperture 60. The exemplary internal cavity 58 extends a first distance and the exemplary internal cavity 54 extends a second distance. In the exemplary embodiment, the respective distances can be defined by the circumferences of the middles of the cavities 54, 58. As shown in FIG. 15, the cavities 54, 58 are separated from one another by the wall 50 over most of the respective distances of the cavities 54, 58. The exemplary cavities 54, 58 begin to merge at the positions 41, 141 and are fully merged between the position 43 and the aperture 60 and between the aperture 60 and the position 143. The vacuum device 92 can be interconnected with the at least one outlet aperture 60 and draw vacuum, whereby welding fumes on the first side 69 and air on the second side 67 are concurrently drawn through the at least one outlet aperture 60 and out of the manifold 26.

Figure 18:
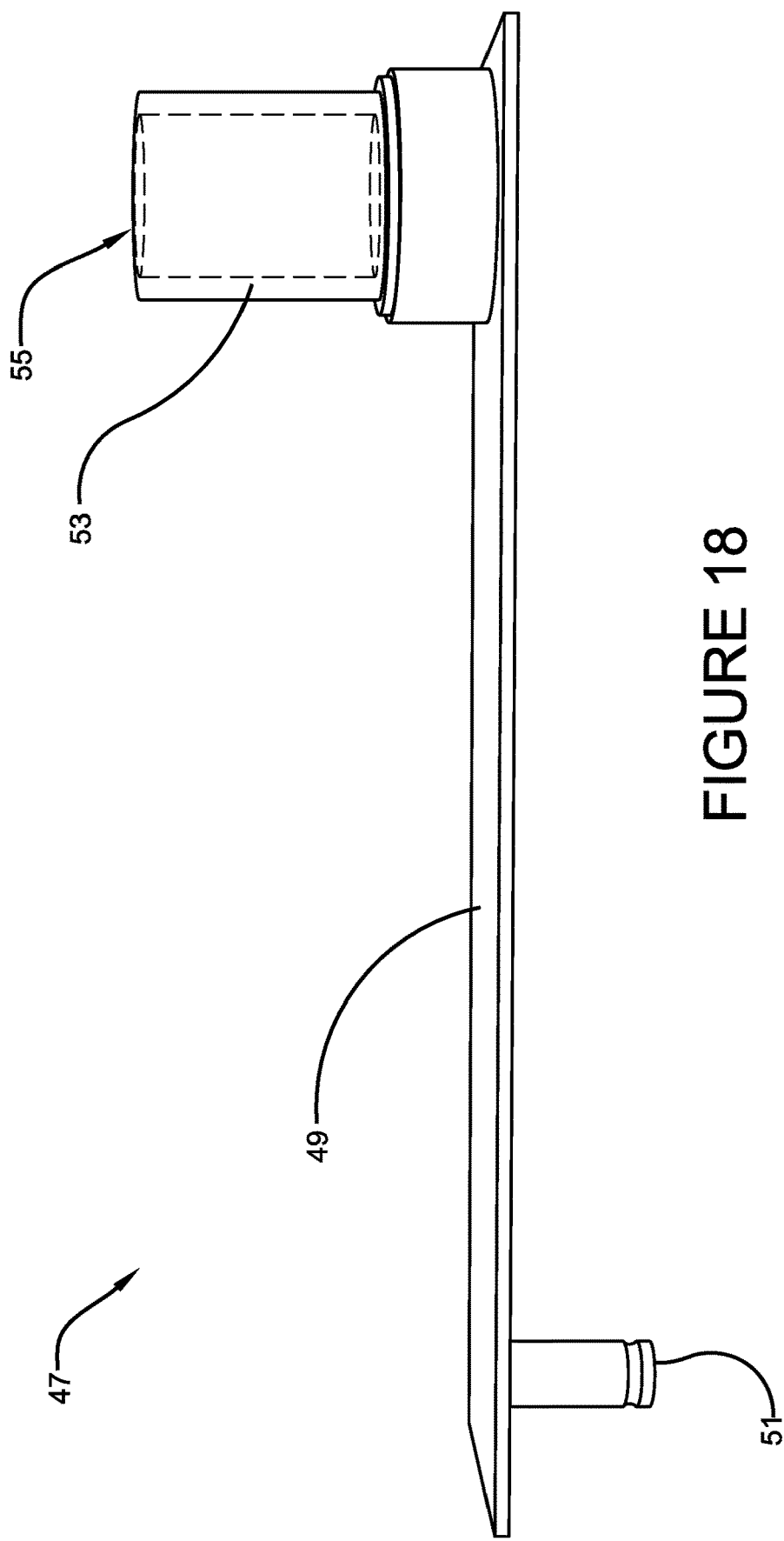
FIG. 18 is a side view of an extender according to an exemplary embodiment of the present disclosure.

Referring now to FIG. 18, in one or more other embodiments of the present disclosure, the welding accessory apparatus 10 can include an extender 47. The extender 47 can enhance the range of the welding accessory apparatus 10 when mounted in a clamp (such as clamp 78) or a base (such as base 80). The exemplary extender 47 includes a plate portion 49, a peg 51 projecting from a bottom side of the plate portion 49 at a first end of the plate portion 49, and a receiving portion 53 projecting from a top side of the plate portion 49 at a second end of the plate portion 49. The receiving portion 53 can include an aperture 55 for receiving the peg 76. The peg 51 can be received in the clamp 76 or base and the peg 76 can be received in the aperture 55. The plate portion 49 and the receiving portion 53 can rotate about the peg 51 to move the welding accessory apparatus 10 among a plurality of different positions. It is noted that a magnetic base, such as base 13, could be formed to be sufficiently weighted and include and aperture to receive the peg 76. The pegs 76, 51 can be freely rotatable when received in either the aperture 55 of the receiving portion 53 or when received in the aperture of the clamp 78.

Figure 19:
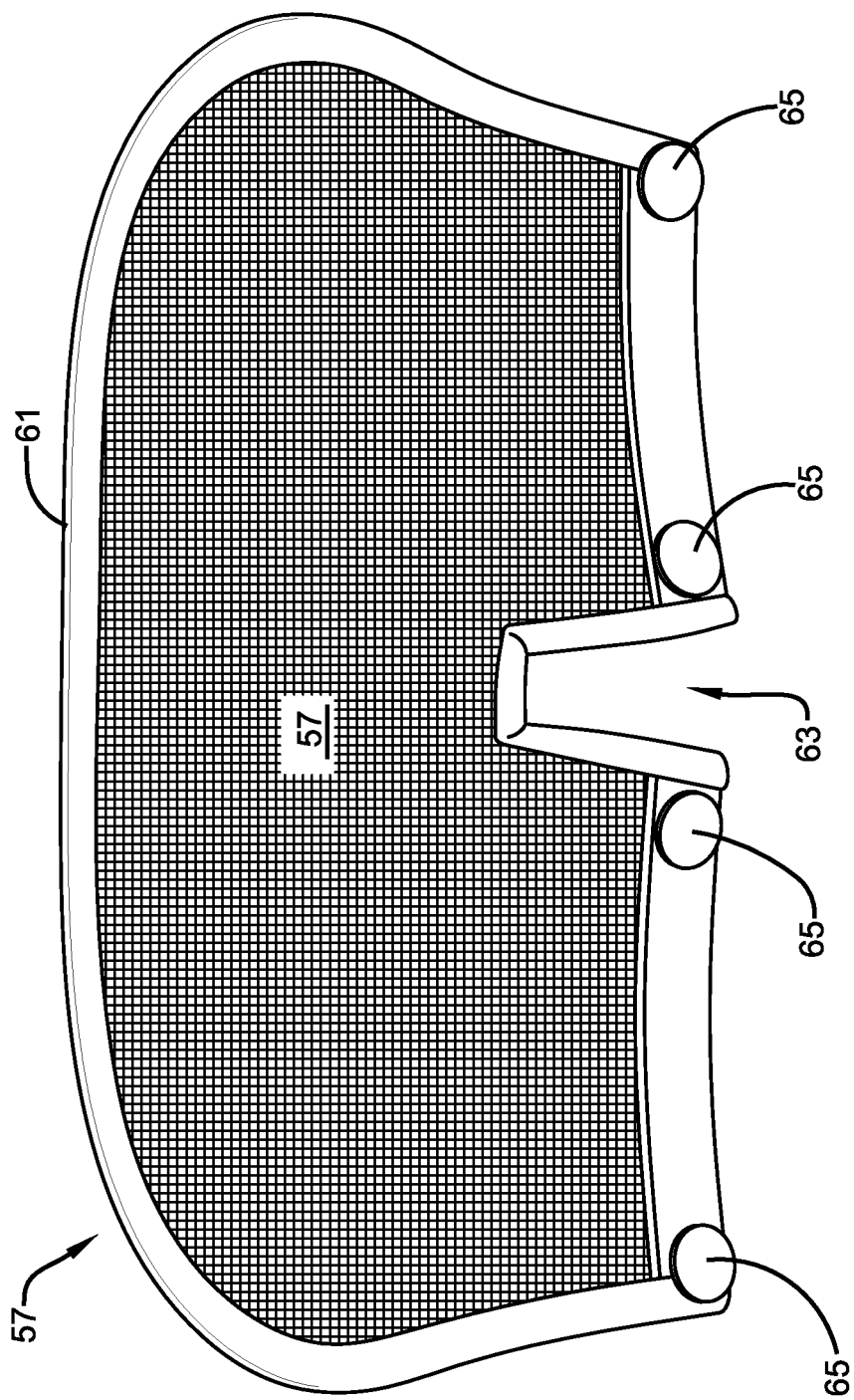
FIG. 19 is a perspective, generally front view of a visor according to an exemplary embodiment of the present disclosure.
Figure 20:
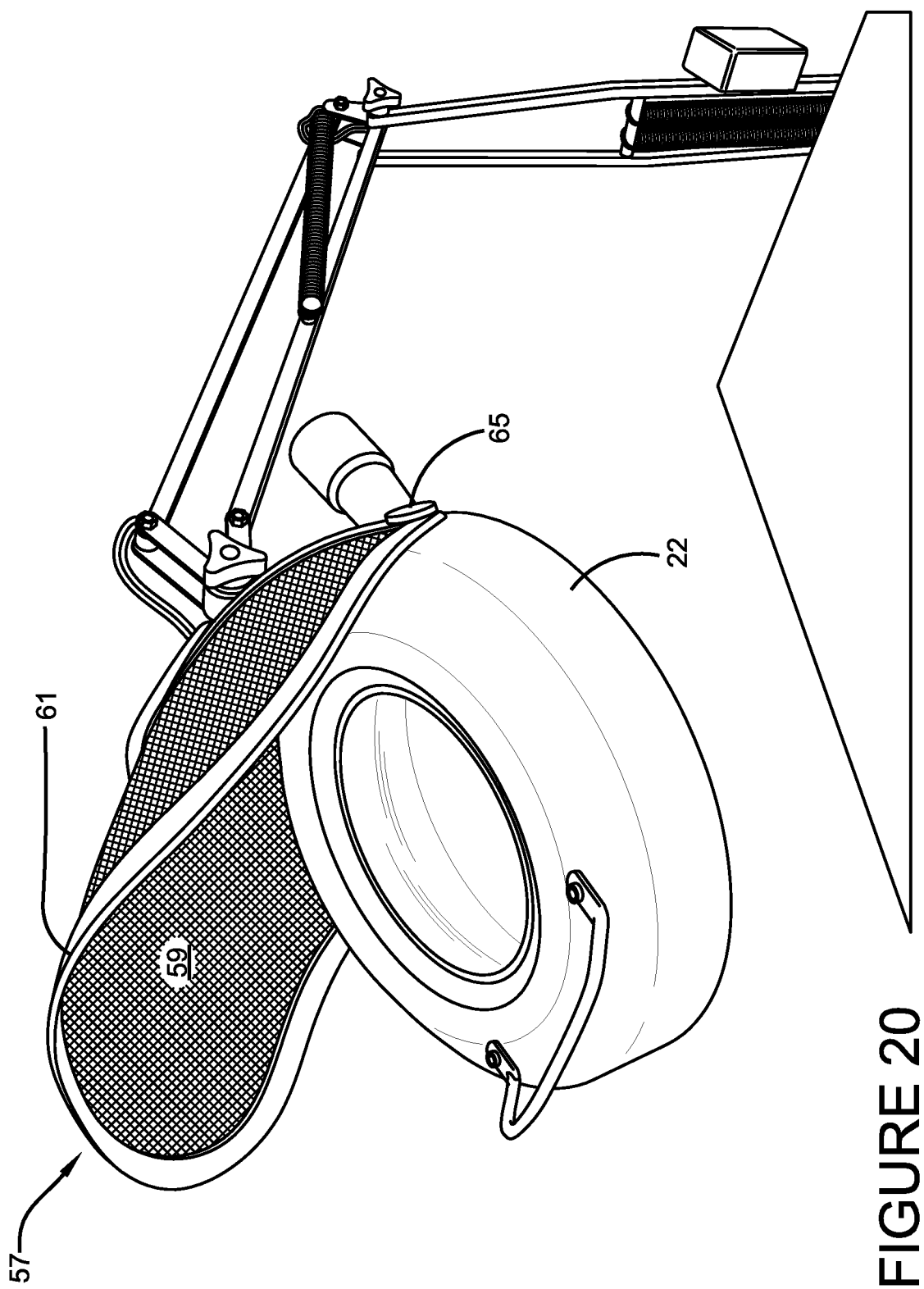
FIG. 20 is a first perspective view of an exemplary visor mounted on an outer shell in a first position and first orientation.
Figure 21:
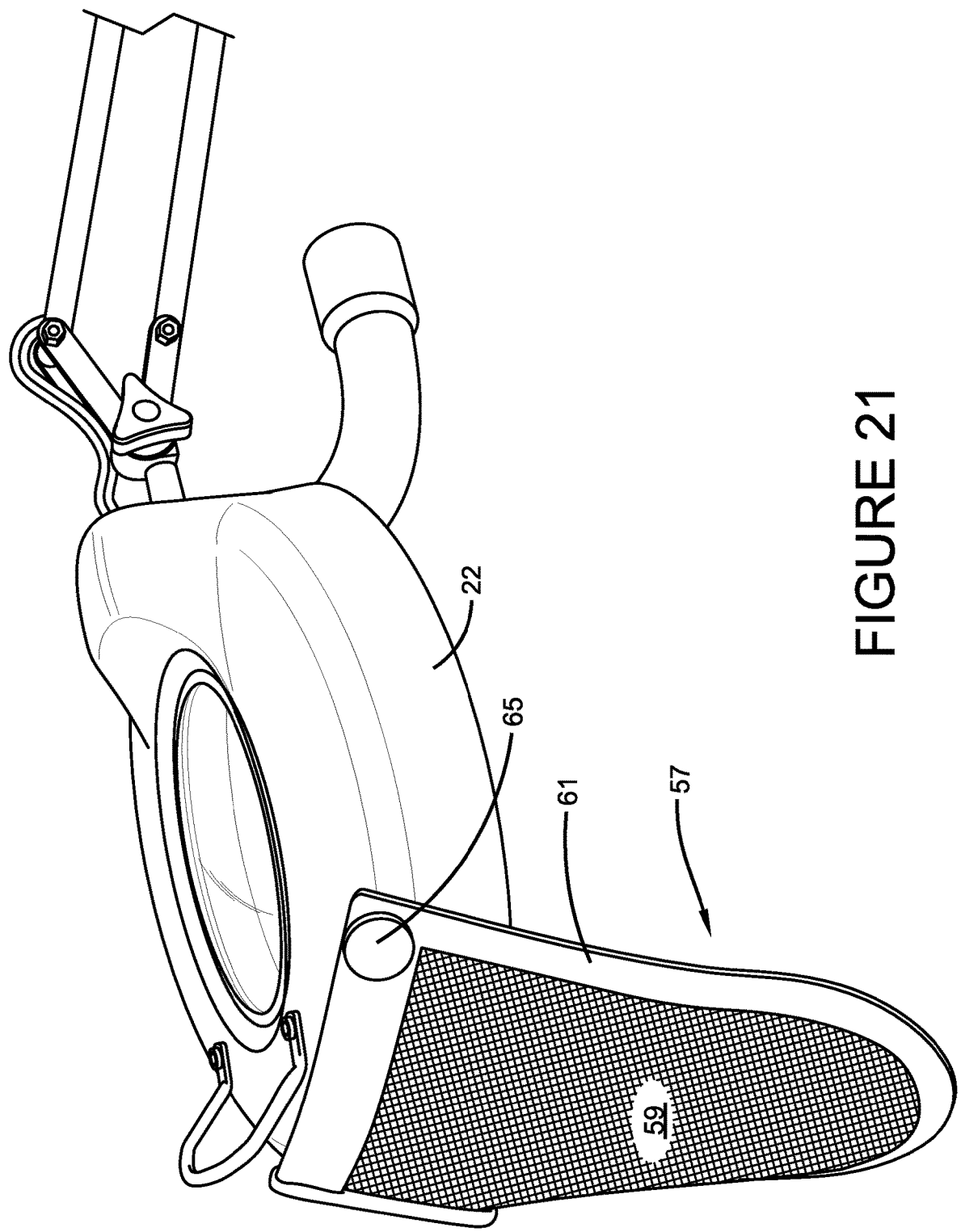
FIG. 21 is a second perspective view of the exemplary visor mounted on the outer shell in a second position and second orientation.

Referring now to FIG. 19, in one or more other embodiments of the present disclosure, the welding accessory apparatus 10 can include a visor 57. The exemplary visor 57 is selectively engagable with the manifold 26, through the shell 22. The visor 57 can be useful to prevent glare on the lens assembly 30 or an auto-darkening lens. The exemplary visor 57 includes a body 59 surrounded by an edge 61. The exemplary body 59 is formed from a wire mesh, providing a good balance of flexibility and rigidity. It is noted that the body 59 could be formed from other materials. The exemplary edge 61 is rubber, but could be formed from other materials. A slot 63 is defined by the visor 57 to receive the arm assembly 18. The visor 57 can also include magnets 65 to releasably attach the body 59 and edge 61 to the manifold 26 through the outer shell 22. FIGS. 20 and 21 show the visor 57 positioned in a variety of different locations and orientations on the shell 22. FIGS. 20 and 21 show the exemplary body 59 projecting past the manifold 26, FIG. 20 showing the body 59 projecting past the top or second side 67 of the manifold 26 and FIG. 21 showing the body 59 projecting past the bottom or first side 69 of the manifold 26.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. Further, the "present disclosure" as that term is used in this document is what is claimed in the claims of this document. The right to claim elements and/or sub-combinations that are disclosed herein as other present disclosures in other patent documents is hereby unconditionally reserved.

What is claimed is:

1. A welding accessory apparatus comprising:
    a welding lens;
    a manifold, said welding lens mounted to said manifold, said manifold having at least one intake aperture spaced from said welding lens, at least one outlet aperture spaced from said at least one intake aperture and said welding lens, and at least one internal cavity communicating with both of said at least one intake aperture and said at least one outlet aperture;
    an articulated arm assembly interconnected with said manifold and configured to be adjustable by hand whereby a user can position said manifold and said welding lens among a plurality of different positions and orientations in three dimensions and said articulated arm assembly retains said manifold and said welding lens in the position and orientation selected by the user; and
    a tube interconnected with said manifold and communicating with said at least one intake aperture and said at least one internal cavity by way of said at least one outlet aperture, at least part of said tube moved and held in place with said manifold and said welding lens by said articulated arm assembly.

2. The welding accessory apparatus of claim 1 further comprising:
    a hose interconnected with said tube, flexible, and hung on said articulated arm assembly.

3. The welding accessory apparatus of claim 2 further comprising:
    a vacuum device interconnected with said hose, said vacuum device configured to draw vacuum through said at least one intake aperture in said manifold, by way of said internal cavity and said at least one outlet aperture and said tube and said hose.

4. The welding accessory apparatus of claim 1 further comprising:
    a flexible curtain extending at least partially around said manifold, said flexible curtain moved and held in place with said manifold and said welding lens by said articulated arm assembly.

5. The welding accessory apparatus of claim 4 wherein said welding lens is centered on a viewing axis, wherein a height of said manifold is defined along said viewing axis, wherein a height of said flexible curtain is defined along said viewing axis, and wherein said height of said flexible curtain is adjustable and greater than a said height of said manifold.

6. The welding accessory apparatus of claim 5 wherein said height of said flexible curtain is adjustable to at least twice said height of said manifold.

7. The welding accessory apparatus of claim 1 wherein said welding lens is further defined as an auto-darkening lens.

8. The welding accessory apparatus of claim 1 wherein said manifold further comprises:
    at least one cooling aperture spaced from said at least one intake aperture and said welding lens and said at least one outlet aperture.

9. The welding accessory apparatus of claim 8 wherein said manifold further comprises a first side configured to face toward a workpiece subjected to welding and a second side opposite to said first side and configured to face away from the workpiece subjected to welding, said at least one intake aperture positioned on said first side and said at least one cooling aperture position on said second side.

10. The welding accessory apparatus of claim 9 wherein said at least one internal cavity of said manifold further comprises:
    a first internal cavity communicating with both of said at least one intake aperture and said at least one outlet aperture and extending a first distance; and
    a second internal cavity communicating with both of said at least one cooling aperture and said at least one outlet aperture and extending a second distance, said first internal cavity and said second internal cavity separated by at least one wall over most of said at least most of said second distance.

11. The welding accessory apparatus of claim 10 further comprising:
    a vacuum device interconnected with said at least one outlet aperture, said vacuum device configured to draw vacuum, whereby welding fumes on said first side and air on said second side are concurrently drawn through said at least one outlet aperture and out of said manifold.

12. The welding accessory apparatus of claim 1 further comprising:
    a peg interconnected with said articulated arm assembly; and
    a clamp selectively engageable with a structure and defining an aperture, said peg selectively insertable in said aperture of said clamp to mount said articulated arm assembly to the structure.

13. The welding accessory apparatus of claim 12 further comprising:
    an extender having a second peg, a plate portion, and a receiving portion with an aperture, said plate portion extending between opposite first and second ends, said second peg mounted to said plate portion at said first end, said receiving portion mounted to said plate portion at said second end, said peg selectively insertable in said aperture of said receiving portion to mount said articulated arm assembly to said extender, said second peg selectively insertable in said aperture of said clamp to mount said articulated arm assembly to the structure through said extender.

14. The welding accessory apparatus of claim 13 wherein said peg is freely rotatable when received in said aperture of said receiving portion and is freely rotatable when received in said aperture of said clamp.

15. The welding accessory apparatus of claim 14 wherein said second peg is freely rotatable when received in said aperture of said receiving portion and is freely rotatable when received in said aperture of said clamp.

16. The welding accessory apparatus of claim 1 further comprising:
    a visor selectively engagable with said manifold, said visor including a body projecting past said manifold and configured to prevent glare on said welding lens.

17. The welding accessory apparatus of claim 16 wherein said body is defined by a mesh.

18. The welding accessory apparatus of claim 16 wherein said body further comprises a slot configured to receive said articulated arm assembly.

19. The welding accessory apparatus of claim 16 wherein said visor further comprises at least one magnet to releasably interconnect said body to said manifold.

20. The welding accessory apparatus of claim 1 further comprising:
    a shell attached to said manifold, said manifold further comprising a first side configured to face toward a workpiece subjected to welding and a second side opposite to said first side and configured to face away from the workpiece subjected to welding and an outer annular wall extending between said first side and said second side, said shell enclosing at least most of said second side and said annular wall, a gap defined between said shell and said second side and between said shell and said annular wall.

* * * * *